United States Patent
Kim et al.

(10) Patent No.: US 10,097,646 B2
(45) Date of Patent: Oct. 9, 2018

(54) METHOD AND DEVICE FOR ENABLING OR DISABLING SERVER IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 718 days.

(21) Appl. No.: 14/397,081

(22) PCT Filed: Jun. 24, 2013

(86) PCT No.: PCT/KR2013/005534
§ 371 (c)(1),
(2) Date: Oct. 24, 2014

(87) PCT Pub. No.: WO2013/191515
PCT Pub. Date: Dec. 27, 2013

(65) Prior Publication Data
US 2015/0127831 A1 May 7, 2015

Related U.S. Application Data

(60) Provisional application No. 61/662,934, filed on Jun. 22, 2012, provisional application No. 61/733,908, (Continued)

(51) Int. Cl.
*H04L 29/08* (2006.01)
*H04W 4/50* (2018.01)
(Continued)

(52) U.S. Cl.
CPC ............ *H04L 67/18* (2013.01); *H04L 67/125* (2013.01); *H04W 4/50* (2018.02); *H04W 4/80* (2018.02);
(Continued)

(58) Field of Classification Search
CPC ............. H04L 41/0206; H04L 41/0213; H04L 41/0233; H04L 67/125; H04L 67/18; H04L 12/24; H04W 4/001; H04W 4/008
See application file for complete search history.

(56) References Cited

U.S. PATENT DOCUMENTS 6,920,616 B1 * 7/2005 Abbott ..................... G06F 1/163
706/45
7,752,296 B2 * 7/2010 Kim ....................... H04L 67/125
709/203
(Continued)

FOREIGN PATENT DOCUMENTS

EP         2 385 734 A1   11/2011
WO    WO 2011/123329 A1   10/2011

OTHER PUBLICATIONS

Open Mobile Alliance, "OMA Device Management Server Delegation Protocol; Candidate Version 1.3", OMA-TS-DM_Server_Delegation_Protocol-V1_3-20120306-C, Mar. 6, 2012, pp. 1-32.

*Primary Examiner* — Ramy M Osman
(74) *Attorney, Agent, or Firm* — Birch, Stewart, Kolasch & Birch, LLP

(57) ABSTRACT

A method of disabling a specific server operating by means of a terminal in a wireless communication system according to the present invention includes: receiving from a first server a message requesting the disabling of the account of the specific server; processing the requesting message; and transmitting a message on the processed results of the requesting message to the first server, wherein if the request
(Continued)

is successfully processed, the specific server is disabled for a period specified by a certain resource and then enabled after the period.

12 Claims, 21 Drawing Sheets

Related U.S. Application Data filed on Dec. 6, 2012, provisional application No. 61/735,562, filed on Dec. 11, 2012, provisional application No. 61/748,722, filed on Jan. 3, 2013.

(51) Int. Cl.
*H04W 4/80* (2018.01)
*H04L 12/24* (2006.01)

(52) U.S. Cl.
CPC ...... *H04L 41/0206* (2013.01); *H04L 41/0213* (2013.01); *H04L 41/0233* (2013.01)

(56) References Cited

U.S. PATENT DOCUMENTS

| | | | | |
|---|---|---|---|---|
| 9,426,043 | B2 * | 8/2016 | Park | H04L 63/1491 |
| 9,426,253 | B2 * | 8/2016 | Jun | H04L 67/303 |
| 9,900,727 | B2 * | 2/2018 | Kim | H04W 4/70 |
| 2005/0024318 | A1 * | 2/2005 | Ho | H04W 52/027 |
| | | | | 345/102 |
| 2007/0261106 | A1 | 11/2007 | Oh et al. | |
| 2008/0184261 | A1 * | 7/2008 | Jun | H04L 67/34 |
| | | | | 719/313 |
| 2008/0189404 | A1 * | 8/2008 | He | H04W 8/245 |
| | | | | 709/223 |
| 2009/0077090 | A1 * | 3/2009 | Pacifici | G06F 9/5038 |
| 2009/0151006 | A1 * | 6/2009 | Saeki | G06F 21/10 |
| | | | | 726/28 |
| 2011/0014939 | A1 * | 1/2011 | Ravishankar | H04W 12/12 |
| | | | | 455/515 |
| 2011/0029671 | A1 | 2/2011 | Deprun et al. | |
| 2011/0099403 | A1 * | 4/2011 | Miyata | G06F 9/5072 |
| | | | | 713/323 |
| 2011/0176171 | A1 * | 7/2011 | Hagiuda | G03G 15/5004 |
| | | | | 358/1.15 |
| 2011/0314293 | A1 | 12/2011 | Yu | |
| 2012/0030741 | A1 | 2/2012 | Chai et al. | |
| 2012/0039202 | A1 * | 2/2012 | Song | H04W 72/00 |
| | | | | 370/252 |
| 2012/0166364 | A1 * | 6/2012 | Ahmad | H04L 51/12 |
| | | | | 706/10 |
| 2013/0031608 | A1 * | 1/2013 | Alfano | H04L 41/042 |
| | | | | 726/3 |
| 2013/0091608 | P1 * | 4/2013 | White | A01H 5/0222 |
| | | | | Plt./118 |
| 2013/0111467 | A1 * | 5/2013 | Sundararaj | H04L 67/1002 |
| | | | | 717/176 |
| 2013/0297789 | A1 * | 11/2013 | Park | H04L 63/1491 |
| | | | | 709/224 |
| 2014/0298331 | A1 * | 10/2014 | Shimogawa | G06F 9/45533 |
| | | | | 718/1 |

* cited by examiner

METHOD AND DEVICE FOR ENABLING OR DISABLING SERVER IN WIRELESS COMMUNICATION SYSTEM

CROSS REFERENCE TO RELATED APPLICATIONS

This application is the National Phase of PCT International Application No. PCT/KR2013/005534, filed on Jun. 24, 2013, which claims priority under 35 U.S.C. 119(e) to U.S. Provisional Application No. 61/662,934, filed on Jun. 22, 2012, 61/733,908 filed on Dec. 6, 2012, 61/735,562 filed on Dec. 11, 2012 and 61/748,772 filed on Jan. 3, 2013, all of which are hereby expressly incorporated by reference into the present application.

TECHNICAL FIELD

The present invention relates to a method for integrating schedules in a wireless communication system and an apparatus for the same.

BACKGROUND ART

With the advent of ubiquitous computing, machine-to-machine (M2M) communication technology has been spotlighted. The M2M communication technology is under study in many standard development organizations (SDOs) including TIA, ATIS, and ETSI. M2M technology is mainly about communication between an M2M server part and an M2M client or M2M device (hereinafter, referred to as M2M device) part. In most cases, communication is performed between a small number of M2M servers and a large number of M2M devices and thus communication overload may be caused to a network between the two entities. Since most M2M devices are battery-based communication devices, a technology of increasing the time period during which a device stays in the power save mode or sleep mode is important in reducing battery consumption or power consumption in the M2M communication environment.

Communication frequently occurring between an M2M device and an M2M server is performed to periodically read the value of a sensor in the M2M device and report the value to the M2M server.

In terms of device management (DM) of managing portable terminals or electronic devices, implementation of an M2M communication system primarily creates an environment in which many servers having different functions manage one device or terminal. For example, a software-managing server, a firmware-managing server, a virtualizing device-managing server and the like manage one device or terminal. In an environment in which several servers are present and a server is added or deleted, there is a need for a process of a particular server granting a right to manage a certain device to another server. For example, when an account of a server for managing firmware is added to a particular terminal, the server needs to grant a right to manage the firmware to a client of the particular terminal.

Regarding grant of a right as above, conventional device management (DM) technology includes a delegation protocol. The delegation protocol includes a delegation process and a delegation revocation process. Through the delegation process, an access right to a certain part of a DM tree of a client within a particular terminal is granted to a server. Through the delegation revocation process, the access right to a certain part of the DM tree of the client within the particular terminal that is granted to the server is deleted.

In the real environment, delegation/delegation revocation may be divided into two cases. In the first case, delegation/delegation revocation occurs semi-permanently. For example, delegation to the server of a particular mobile carrier may occur when a particular terminal join the mobile carrier, and delegation revocation may occur when the terminal is disjoined. In the second case, delegation/delegation revocation frequently occurs. For example, when a terminal enters a building of a company, it receives DM service from the server of the company (delegation). When the terminal moves out of the company building, the server of the company interrupts the DM service (delegation revocation).

For the second case, using conventional delegation/delegation revocation complicates the processing processes such as setting/deleting an access right and storing/deleting information about a server and causes excessive computation in the client within the terminal. Accordingly using the conventional delegation/delegation revocation is not preferable. That is, in the case in which delegation and delegation revocation are frequently repeated, a processing technique simpler than the conventional technology is needed.

The present invention proposes delegation and delegation revocation techniques optimized for an environment in which delegation/delegation revocation frequently occur as in the second case.

DISCLOSURE

Technical Problem

An object of the present invention devised to solve the problem lies in a technique for performing delegation/delegation revocation of an access right over a specific resource without registering/deleting existing DM account information under certain conditions.

Another object of the present invention devised to solve the problem lies in a technique for performing temporary enablement/disablement of a server account to implement delegation/delegation revocation of an access right Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for disabling a particular server in a wireless communication system, the method being performed by a terminal and including receiving, from a first server, a message for requesting disablement of an account of the particular server, processing the received message, and transmitting, to the first server, a message about a result of the processing of the received message, wherein the particular server may be disabled during a period indicated by a particular resource, and enabled after the period if the request is successfully processed.

Preferably, the method may further include collecting information about the particular server during the period indicated by the particular resource, and transmitting the collected information to the particular server if the particular server is enabled after the period.

Preferably, the method may further include transmitting, to the particular server, a message for requesting deregistration for the particular server, and receiving, from the particular server, a message in response to the message for requesting the deregistration, wherein the transmitting and the receiving may be performed before the particular server is disabled after the transmitting of the message about the result of the processing of the received message.

Preferably, network connection between the terminal and the particular server may be cut off before the particular server is disabled after the transmitting of the message about the result of the processing of the received message.

Preferably, the method may further include transmitting, to the particular server, a message for requesting registration for the particular server, and receiving, from the particular server, a message in response to the message for requesting the registration, wherein the transmitting and the receiving may be performed when the particular server is enabled after the period.

Preferably, the method may further include receiving, from the particular server, a message for setting the period indicated by the particular resource, wherein the message for setting the period indicated by the particular resource includes an identifier of the particular resource and a value to be set as the period.

Preferably, the message for requesting disablement of the account of the particular server may cause the terminal to execute a disablement resource among information related to the particular server or to write a new value as a value of the disablement resource, the information consisting of a plurality of resources stored in the terminal.

In another aspect of the present invention, provided herein is a method for disabling a particular server in a wireless communication system, the method being performed by a first server and including transmitting, to a terminal, a message for requesting disablement of an account of the particular server, and receiving, from the terminal, a message about a result of processing the request, wherein the particular server may be disabled during a period indicated by a particular resource, and enabled after the period if the request is successfully processed.

Preferably, when the particular server may be the first server, and the method may further include receiving, from the terminal, information about the first server collected by the terminal during the period indicated by the particular resource if the first server is enabled after the period.

Preferably, when the particular server may be the first server, and the method may further include receiving, from the terminal, a message for requesting deregistration for the first server, and transmitting, to the terminal, a message in response to the message for requesting the deregistration, wherein the receiving and the transmitting may be performed before the first server is disabled after the receiving of the message about the result of the processing.

Preferably, network connection between the terminal and the particular server may be cut off before the particular server is disabled after the receiving of the message about the result of the processing.

Preferably, when the particular server may be the first server, and the method may further include receiving, from the terminal, a message for requesting registration for the first server when the first server is enabled after the period, and transmitting, to the terminal, a message in response to the message for requesting the registration.

Preferably, the method may further include transmitting, to the terminal, a message for setting the period indicated by the particular resource, wherein the message for setting the period indicated by the particular resource may include an identifier of the particular resource and a value to be set as the period.

Preferably, the message for requesting disablement of the account of the particular server may cause the terminal to execute a disablement resource among information related to the particular server or to write a new value as a value of the disablement resource, the information consisting of a plurality of resources stored in the terminal.

In another aspect of the present invention, provided herein is a terminal for disabling a particular server in a wireless communication system, including a radio frequency (RF) unit, and a processor configured to control the RF unit, wherein the processor may be configured to receive, from a first server, a message for requesting disablement of an account of the particular server, to process the received message, and to transmit, to the first server, a message about a result of the processing of the received message, wherein the particular server may be disabled during a period indicated by a particular resource, and enabled after the period if the request is successfully processed.

In another aspect of the present invention, provided herein is a server for disabling a particular server in a wireless communication system, including a radio frequency (RF) unit, and a processor configured to control the RF unit, wherein the processor may be configured to transmit, to a terminal, a message for requesting disablement of an account of the particular server, and to receive, from the terminal, a message about a result of processing the received message, wherein, when the request is successfully processed, the particular server may be disabled during a period indicated by a particular resource, and enabled after the period if the request is successfully processed.

The technical solutions above are simply part of embodiments of the present invention, and various embodiments reflecting the technical features of the present invention will be drawn and understood by those skilled in the art based on the detailed description of the present invention given below.

Advantageous Effects

According to one embodiment of the present invention, communicational/computational overhead in a terminal that registers/deletes DM account information may be reduced.

According to one embodiment of the present invention, communicational/computational overhead caused by addition/deletion of access right information to/from a DM tree may be reduced.

According to one embodiment of the present invention, throughput for delegation/delegation revocation may be enhanced.

It will be appreciated by persons skilled in the art that that the effects that can be achieved through the embodiments of the present invention are not limited to those described above and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 24 is a diagram illustrating a disablement procedure for a server according to one embodiment of the present invention.

BEST MODEL

Figure 1:
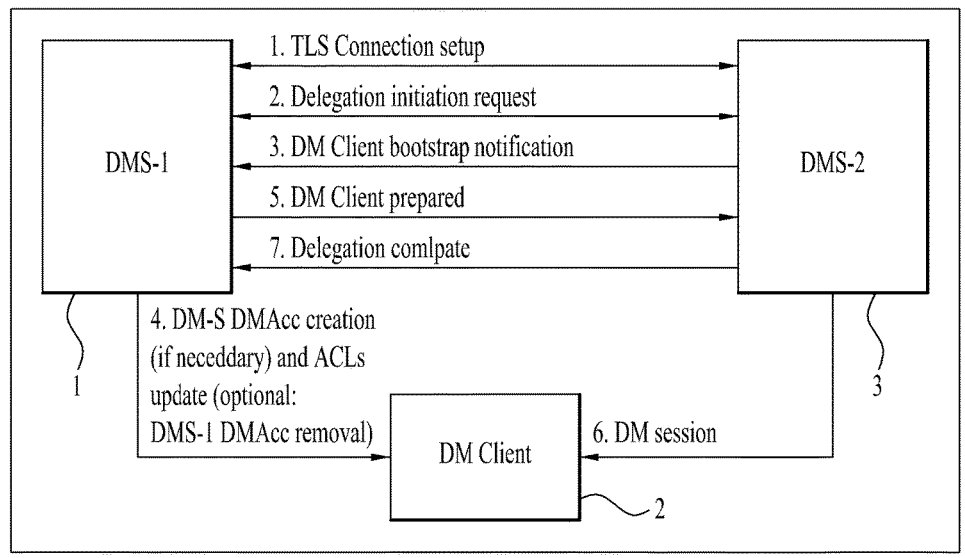
FIG. 1 shows a delegation request procedure according to the conventional art.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present all the embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams. Wherever possible, the same reference numbers will be used throughout the drawings to refer to the same parts.

In the present invention, a device for machine-to-machine communication, i.e., an M2M device may be fixed or movable. M2M devices include various devices that perform communication with a server for machine-to-machine communication, i.e., an M2M server to transmit/receive user data and/or various kinds of control information. The M2M device may also be referred to as a terminal equipment, 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. In the present invention, the M2M server generally refers to a fixed station that performs communication with M2M devices and/or other M2M servers. The M2M server performs communication with M2M devices and/or other M2M serves to exchange various kinds of data and control information.

Hereinafter, a description will be given of background technologies relevant to the present invention.

Device Management

Device management (DM) refers to management of a device configuration and other managed objects of devices from the point of view of various management authorities. Device management includes, but is not restricted to, setting initial configuration information in devices, subsequent updates of persistent information in devices, retrieval of management information from devices and processing events and alarms generated by devices.

Management Tree

Management tree is an interface by which the management server interacts with the client, e.g. by storing and retrieving values from it and by manipulating the properties of it, for example, the access control lists (ACLs). In the specification, the term "management tree" will be interchangeably used with "device management tree" or "DM tree."

Management Object (MO)

A management object is a subtree of the management tree which is intended to be a (possibly singleton) collection of nodes which are related in some way. For example, the ./DevInfo nodes form a management object. A simple management object may consist of one single node.

DM Server or DMS (Device Management Server)

A DM Server or DMS may be an abstract software component in a deployed device management infrastructure that conforms to the OMA Device Management Enabler static conformance requirements specified for DM servers. It serves as an end-point of the DM Client-Server Protocols and DM Server-Server Interface.

In addition, in this specification, the DM server or DMS may be embedded in a unit, a device, and a computer which are provided with a processor module and the like, and therefore can be implemented as a single unit.

DM Client or DMC (Device Management Client)

A DM client or DMC is an abstract software component in a device implementation that conforms to the OMA Device Management Enabler static conformance requirements specified for DM clients. It serves as an end-point of the DM Client-Server Protocols.

In this specification, the DM client or DMC may be embedded in a unit which is subjected to DM and provided with a processor module and the like, and therefore can be implemented as a single unit.

Access Control List (ACL)

A list of identifiers and access rights associated with each identifier.

Node

A node is a single element in a management tree. There can be two kinds of nodes in a management tree: interior nodes and leaf nodes. The format property of a node provides information about whether the node is a leaf or an interior node.

Interior Node

An interior node is a node that may have child nodes, but cannot store any value. The format property of an interior node is node.

Leaf Node

A leaf node is a node that can store a value, but cannot have child nodes. The format property of a leaf node is not node.

Accordingly, all parent nodes should be interior nodes.

Permanent Node

A node is permanent if the DDF property Scope is set to Permanent. If a node is not permanent, it is dynamic. A permanent node can never be deleted by the server.

Dynamic Node

A node is dynamic if the DDF property scope is set to Dynamic, or if the scope property is unspecified.

Sever Identifier

This refers to the OMA DM internal name for a DM server. A DM Server is associated with an existing server identifier in a device through an OMA DM account.

ACL Property and ACL Value

All terminals managed according to the device management (DM) protocol have a DM tree starting with a root node, and the DM protocol issues a management command to terminals by manipulating each node in the DM tree. For example, downloaded software can be installed onto a terminal by executing a node called "Install" that is matched with the software. Each node may indicate simple information such as a number or complex data such as photo data or log data. In addition, a node may indicate a single command such as Execute and Download.

Each node has properties that provide meta information related to the node. Among these properties, a runtime property represents a property that is available until the node generated in the DM tree is extinguished. The runtime property includes an ACL, a format, a name, a size, a title, a TStamp, a type, and a VerNo.

The access control list is an essential function that both the terminal and the server need to implement according to DM 1.3 protocol. The ACL specifies DM commands which a specific DM server can execute on a specific node. Unspecified DM commands cannot be executed. In other words, the ACL represents a right granted to the specific DM server with respect to the specific node. In the DM protocol, the ACL is assigned to a server identifier of the DM server rather than to URI, IP address, and DM server certificate. This server identifier is used as an identifier to authenticate the DM server in the DM protocol. In addition, the ACL may be provided through an ACL property and an ACL value assigned to the ACL property. In this specification, ACL value may be interchangeably referred to as ACL information or information about the ACL. According to DM 1.3 protocol, all nodes are defined as having an ACL property, and each of the nodes having an ACL property is defined as including an empty ACL value or a non-empty ACL value.

The ACL has a unique property different from the other runtime properties. A representative example of the unique property is ACL inheritance. ACL inheritance is a concept meaning that the ACL value of a node is inherited from the ACL value of a parent node when the node in a DM tree does not have an ACL value. If the parent node does not have an ACL value, the ACL value is inherited from the parent node of the parent node. Since the DM protocol clearly states that a root node which forms the node of the highest level in a DM tree should have an ACL value, an ACL value is certainly inherited. Such ACL inheritance is not individually implemented for each DM command, but is implemented for all the ACL values. Accordingly, only when the ACL value is empty, ACL inheritance from the parent node is carried out. That is, if the ACL value of a node specifies only the "Add" right, the unspecified rights such as "Get" right are not inherited.

In the DM protocol, a root node has "Add=*&Get=*" as a default value for an ACL. Herein, "*" is a wild card that stands for any DM server. To obtain an ACL value, a DM server uses the Get command. The Get command for "./NodeA/Node1?prop=ACL" gets the ACL value of ./NodeA/Node1. To change the ACL value, a Replace command can be used. When the Replace command is executed on "./NodeA/Node1?prop=ACL" to change the value to "Add=DMS1&Delete=DMS1&Get=DMS1", the ACL value is changed. The DM protocol prescribes that an individual ACL entry cannot be changed, but the entire ACL value can be changed. A right to get and modify an ACL value is also defined based on the ACL, but more or less differently for the interior node and the leaf node.

—Interior Node

When Get and Replace rights are given for a node, the Get right implies a right to get and replace an ACL value of the node. The Replace right implies a right to change the ACL values of all the child nodes.

—Leaf Node

A Get right to a node refers to a right to get a value of the node. To get an ACL, a Get right for the parent node should be given.

Similarly, a Replace right to a node refers to a right to replace the value of the node. To replace the ACL, a Replace right to the parent node should be given.

A Replace right to an interior node refers to a right to replace not only the ACL value of an interior node but also the ACL values of all the child nodes. Accordingly, a Replace right to a root node implies that any rights can be given for all nodes in a DM tree. However, a Replace right to the parent node does not directly include a specific right such as a Get right for a child node thereof. A right such as a Get right should be directly specified for the child node. Accordingly, an ACL value needs to be modified before a command is executed. The ACL value of a child node is modified by modifying the ACL values of all nodes arranged all the way to the child node. This operation is inconvenient. Thus, the DM protocol allows the ACL value of a node to be modified without modifying the ACL values of intermediate nodes if the Replace right to a parent node or an ancestor node of the node is given.

When the DM server generates a new node through the Add command, the generated node generally does not have an ACL value. Thus, the generated node inherits all rights from the parent node. However, if the generated node is an interior node, and a Replace right to the parent node is not given, an ACL value needs to be set upon generation of the new node in order to have as sufficient rights as to manage the node.

A grammar for presenting an ACL value is defined in [DM-TND]. An example of the ACL value may be "Get=DMS1&Replace=DMS1&Delete=DMS2". Herein, DMS1 and DMS2 are server identifiers of DM Servers, and "Get," "Replace," and "Delete" are DM commands. Accordingly, DMS1 can execute Get and Replace commands for the corresponding node, and DMS2 can execute the Delete command. In addition, "Get=DMS1," "Replace=DMS1," "Delete=DMS2" are ACL-entries, and represent individual command rights of DM servers, respectively. In other words, the ACL value is a set of individual ACL-entries, and an ACL value of a node may include at least one ACL entry.

Device Description Framework (DDF)

DDF is a specification for how to describe the management syntax and semantics for a particular device type. DDF provides information about an MO, a management function and a DM tree structure of a terminal.

DM 1.3 Authentication

In DM 1.3, authentication is performed based on ACL. DM authentication is separately performed for each DM command. In the case in which a DM server has transmitted multiple DM commands, a DM client (hereinafter, DMC) performs authentication before executing individual commands. As a result, the DMC executes only authorized DM commands.

Delegation Protocol in DM (Device Management) 1.3 defines an operation of a DMS making a request for delegation or revocation of delegation of control for the DM tree of a particular DMC to another DMS.

DMC authority delegation is an operation through which a DMS provides another DMS with the authority to control a particular DMC. Another DMS can be within the same management authority (MA) or present in another MA. This function may provide flexibility in terms of management. DMC authority delegation involves at least two DMSs and one DMC. One of the two servers that sets delegation is referred to as DMS-1, and the other server that is delegated is referred to as DMS-2.

DMC authority delegation can be executed through the following steps.

Step 1: A delegation request is accepted.

Step 2: Account information about the delegated DMS is added to the DMC.

Step 3: An access control list (ACL) value for the DM tree is set.

There are two scenarios for the delegation process. In the first scenario, DMS-2 provides account information (e.g., a DM account MO) for DMS-1, and this information is added to the DMC. In the second scenario, DMS-2 provides URL of a bootstrap server for DMS-1, and DMS-1 in turn forwards the URL to the DMC.

Given that there is a delegation function to provide the authority to manage the DMC, there is also a delegation revocation function of revoking the authority to manage the DMC. There are three scenarios of delegation revocation. In the first scenario, DMS-1 performs delegation revocation using a typical method. That is, when there is ACK from DMS-2 in response to a delegation revocation request, the account information about the DMS is deleted. The second scenario is a case in which DMS-2 makes a request for termination of delegation to DMS-1. The third scenario relates to a method for DMS-1 to perform delegation revocation of deleting the account information of DMS-2 without information DMS-2 about the deletion.

FIG. 1 shows a delegation technique using DMS-2 DMAcc access.

Step 1: TLS Connection Setup

The two DMSs performs mutual authentication through the HTTPS session. The two DMSs must support X.509 digital certificates-based authentication at the TLS.

Step 2: Delegation Initiation Request

The delegation process may be initiated by DMS-1 or DMS-2.

Step 3: DMS-2 bootstrap notification

DMS-2 informs DMS-1 of whether DMS-2 has been bootstrapped in the DMC or whether DMAcc information of DMS-2 needs to be created in the DMC.

Step 4: DMS-2 DMAcc creation (if necessary) and ACLs update

If DMS-2 has not been bootstrapped, DMS-1 creates DMAcc of DMS-2 in the DMC based on the response in step 3.

DMS-1 updates ACLs for DMS-2 in the DM Tree of the DMC.

DMS-1 informs the DMC that the DMC should not initiate the DM session for DMS-2. NOTE: This method may be implemented by setting the value of "NoAutoInitialSession" node in DMAcc[DM Acc] to "false." This value can be changed later due to DMS-1 or DMS-2 when necessary. For example, DMS-1 may implement timeout for delegation complete message. Thereby, when timeout occurs, the DMC may automatically perform connection to DMS-2.

Step 4b: DMS-1 DMAcc removal from DM Client Delegation complete (Optional)

When DMS-1 performs full delegation, DMS-1 deletes DMS-1 DMAcc of the DMC.

Step 5: DM Client prepared

DMS-1 informs DMS-2 that the DMC has been prepared.

Step 6: DM session initiation

DMS-2 initiates a DM session with the DMC.

Step 7: Delegation complete

DMS-2 informs DMS-1 that the delegation process has been completed.

Figure 2:
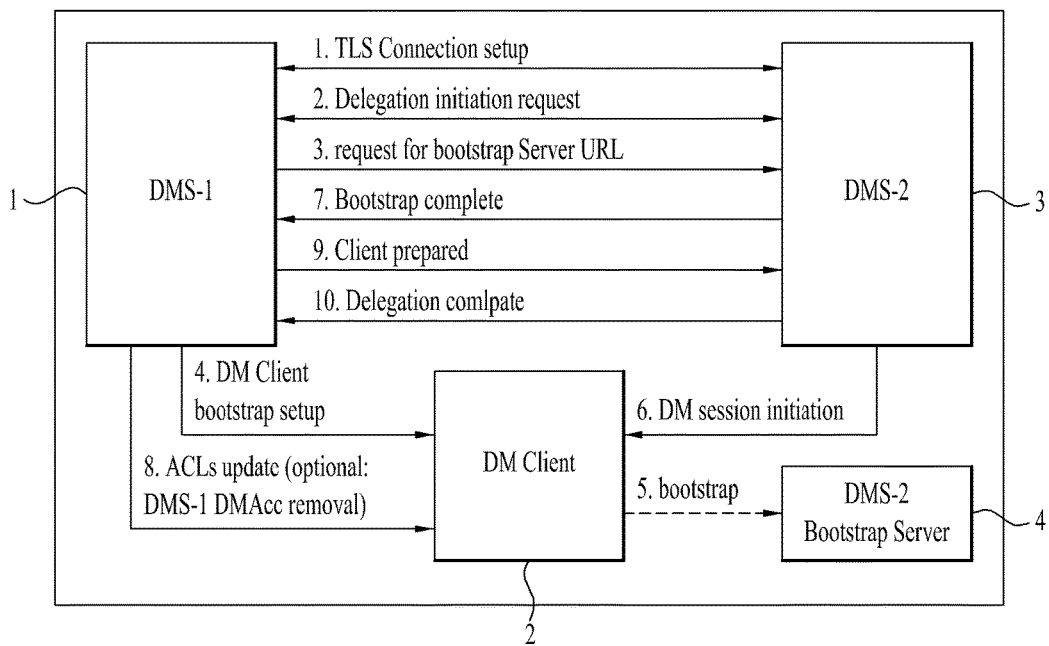
FIG. 2 shows a delegation procedure according to the conventional art.

FIG. 2 shows a delegation technique using DMS-2 bootstrap server URL access.

Step 1: TLS Connection Setup

The two DMSs performs mutual authentication through the HTTPS session. The two DMSs must support X.509 digital certificates-based authentication at the TLS.

Step 2: Delegation Initiation Request

The delegation process may be initiated by DMS-1 or DMS-2.

Step 3: DMS-1 makes a request to DMS-2 for its Bootstrap Server URL

DMS-1 makes a request for the bootstrap server URL of DMS-2 to DMS-2. DMS-2 transmits the bootstrap serverURL to DMS-1.

Step 4: DM Client bootstrap setup

DMS-1 provides the bootstrap server URL of DMS-2 for the DMC. For example, a new entry is added to Bootstrap Config MO of a device or a terminal.

Step 5: DM Client request DMS-2 bootstrap

The DMC makes a request for bootstrap of DMS-2 to the bootstrap server through the bootstrap server URL of DMS-2 (the bootstrap server and DMS-2 may be the same physical device).

The bootstrap server provides the DMC with the bootstrap information of DMS-2.

Step 6: DM session initiation

The DMC initiates a DM session with DMS-2 after the bootstrap.

Step 7: DMS-2 bootstrap complete

DMS-2 informs DMS-1 that the DMC has been bootstrapped.

Step 8: DMS-1 updates ACLs

DMS-1 updates ACLs of the DM trees for DMS-2.

Step 8b: (Optional) DMS-1 DMAcc removal from DM Client Delegation complete

When DMS-1 performs full delegation, DMS-1 deletes DMS-1 DMAcc of the DMC.

Step 9: Client prepared

DMS-1 informs DMS-2 that the DMC has been prepared.

Step 10: Delegation complete

DMS-2 informs DMS-1 that the delegation process has been completed.

Figure 3:
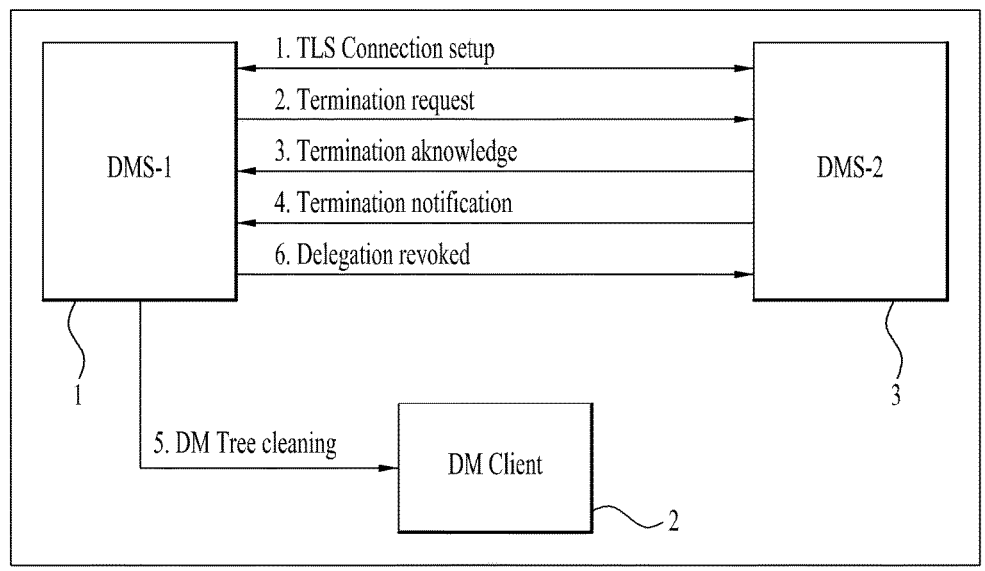
FIG. 3 shows a delegation revocation process according to the conventional art.
Figure 4:
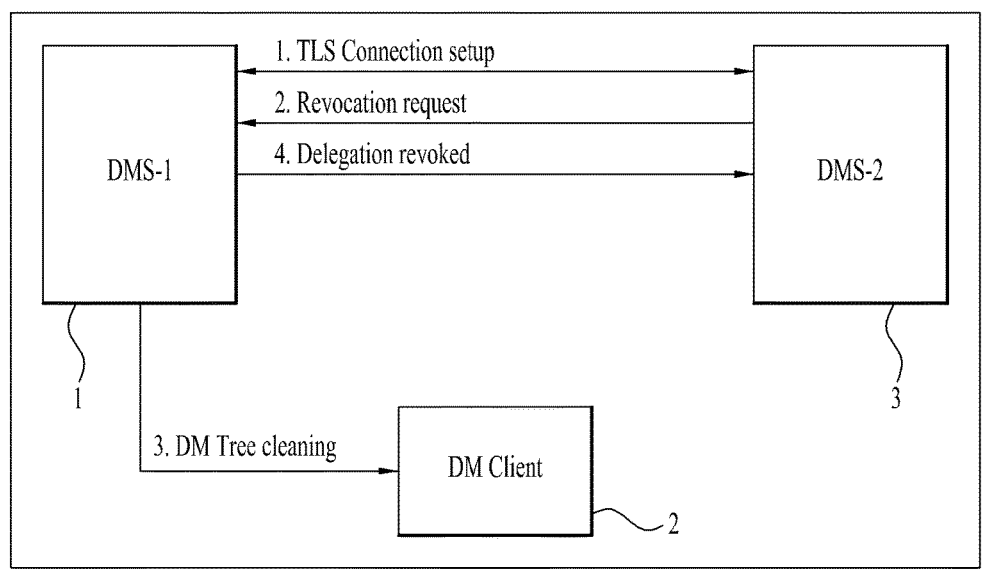
FIG. 4 shows another delegation revocation process according to the conventional art.

FIG. 3 illustrates a case in which delegation revocation is requested.

Step 1: TLS Connection setup

The two DMSs performs mutual authentication through the HTTPS session. The two DMSs must support X.509 digital certificates-based authentication at the TLS.

Step 2: Activities termination request

DMS-1 makes a request for termination of all activities on the DMC to DMS-2 to ensure safe delegation revocation.

Step 3: Activities acknowledge

DMS-2 transmits acknowledgement of the termination request to DMS-1.

Step 4: Activities termination notification

DMS-2 informs DMS-1 that all activities on the DMC have been terminated and that delegation revocation can be safely performed.

NOTE: DMS-1 may implement timeout for activities termination notification of DMS-2. Once timeout occurs, DMS-1 can perform step 5 even if it does not receive the notification.

Step 5: Delegation Removal

DMS-1 deletes information (e.g., DMAcc and ACLs in the DM tree) about DMS-2 from the DM tree of the DMC.

Step 6: Delegation Revocation notification

DMS-1 informs DMS-2 that the delegation revocation has been successfully completed.

FIG. 3 illustrates another case in which delegation revocation is requested.

Step 1: TLS Connection setup

The two DMSs performs mutual authentication through the HTTPS session. The two DMSs must support X.509 digital certificates-based authentication at the TLS.

Step 2: Delegation Revocation request

DMS-2 makes a request for delegation revocation to DMS-1.

Step 3: Delegation Removal

DMS-1 deletes information (e.g., DMAcc and ACLs in the DM tree) about DMS-2 from the DM tree of the DMC.

Step 4: Delegation Revocation notification

DMS-1 informs DMS-2 that the delegation revocation has been successfully completed.

Figure 5:
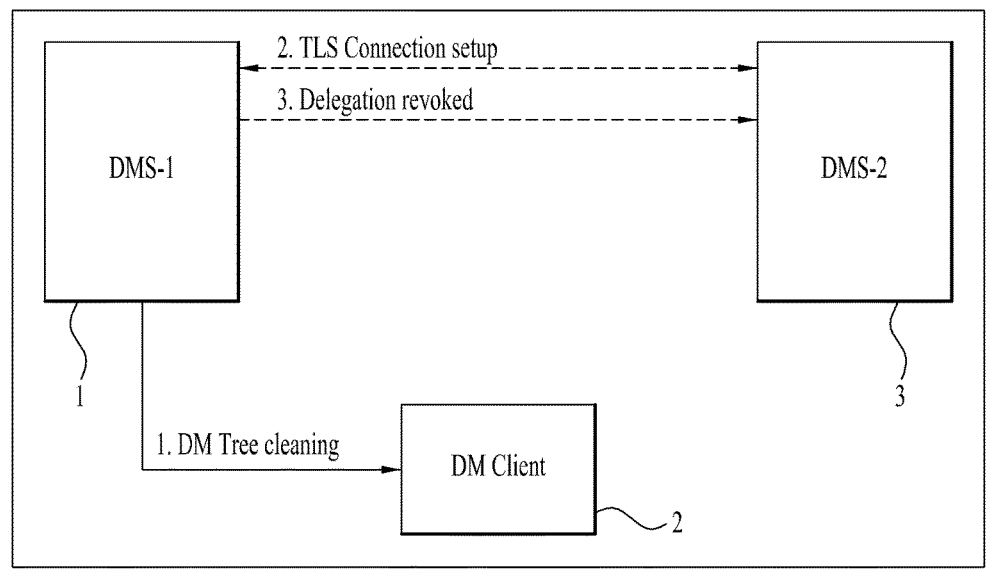
FIG. 5 shows another delegation revocation process according to the conventional art.

FIG. 5 illustrates a case in which delegation revocation is forced.

Step 1: Delegation Removal

DMS-1 deletes information (e.g., DMAcc and ACLs in the DM tree) about DMS-2 from the DM tree of the DMC.

Step 2: TLS Connection setup

The two DMSs performs mutual authentication through the HTTPS session. The two DMSs must support X.509 digital certificates-based authentication at the TLS.

Step 3: (Optional) Delegation Revocation notification

DMS-1 informs DMS-2 that delegation revocation has occurred.

The DM NG delegation process is performed as follows.

When a DMS has an access right to a MO instance, this right is exposed to other DMSs through a delegation access control (DAC) MO. The conventional access control rule is not applied to the DAC MO. If the DMS has a delegation access right to the MO instance, it has a right to change the access right to the instance. If the DMS does not have the delegation access right to the MO instance, the DMS can only read the access right values of all the DMSs.

Figure 6:
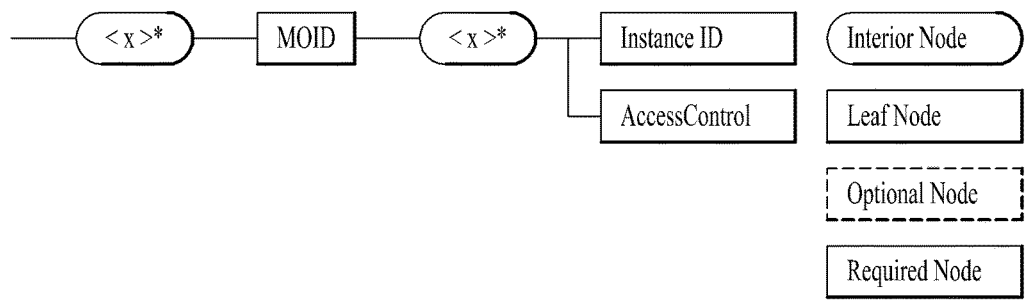
FIG. 6 is a diagram illustrating a DM tree structure of a DAC MO.

FIG. 6 shows a DM tree structure of a DAC MO. The "InstanceID" node represents the ID of the MO instance, and the "AccessControl" node stores an access right value that a particular DMS has in the MO instance.

DM delegation can be classified based on two references.

—Classification According to Existence of DMS Bootstrap

Delegation can be divided into two classes according to whether a delegated DMS is registered in the DM account of the DMC, namely, whether the delegated DMS is bootstrapped in the DMC.

Delegation for a New DMS

This class delegation corresponds to a case in which the delegated DMS is not registered in the DM account of the DMC. This delegation includes a step of the delegation-setting DMS adding the DM account of the delegated DMS to the DMC and a step of the delegation-setting DMS allocating the access right to the delegated DMS to the DM tree.

Delegation for the Bootstrapped DMS

This class delegation corresponds to a case in which the delegated DMS is already registered in the DM account of the DMC. This delegation refers to a step of the delegation-setting DMS allocating the access right to the delegated DMS to the DM tree of the DMC.

—Classification of Delegation Revocation According to Whether or not the DM Account is Deleted Delegation revocation can be divided into classes according to whether or not the DMS that sets delegation deletes the delegated DMS from the DM account of the DMC.

Delegation Revocation by Deletion of DM Account

This class delegation revocation includes a step of the delegation-setting DMS deleting information about the delegated DMS from the DM account of the DMC and a step of the delegation-setting DMS deleting/canceling the access right to the delegated DMS from the DM tress of the DMC. The delegation revocation also includes a step of deleting all access right information about the delegated DMS from the DM tree of the DMC.

Delegation Revocation without Deleting DM Account

This class delegation revocation refers to a step of deleting/canceling the access right to the delegated DMS from the DM tree of the DMC.

—Problems of the Conventional Art

In the conventional DM 1.3, the delegation/delegation revocation process and DM NG delegation process are procedures in which one DMS allows the other DMS to access or control the DM tree of a specific terminal or a device. However, the conventional art causes significant load in an environment in which delegation and delegation revocation frequently occur as described below.

In the Case of Delegation

Communication overhead for sending a delegation request/response to the other DMS Communication/storage overhead for provisioning DM account information (if necessary)

Communication/computation overhead for adding access right information to a DM tree, In the Case of Delegation Revocation Communication overhead for sending a delegation revocation request/response to the other DMS Communication overhead for deleting DM account information (if necessary)

Communication/computation overhead for deleting access right information from the DM tree For delegation/delegation revocation which frequently occur, use of the conventional art may cause significant overhead to a device (or a terminal) and a network as described above. In this regard, the present invention is intended to reduce the process of adding/deleting information about the server (e.g., the account of the server) as much as possible during delegation/delegation revocation. To this end, the present invention proposes a method for enabling or disabling the server in a terminal.

In the present invention, a DMS capable of enabling/disabling a particular DMS (an enabling DMS) refers to a DMS which is capable of performing access right to modify a node (or resource) indicating enablement/disablement of the DM account of a particular DMS (an enabled DMS) or performing an enablement/disablement executing node (or a resource). A delegating DMS corresponds to a DMS which is capable of generating/deleting/modifying the DM account of a delegated DMS and modifying the right of the delegated DMS in the DM tree of the DMC.

First Embodiment: New Delegation Revocation Method

The new delegation revocation method is classified into delegation revocation through account deletion and delegation revocation without account deletion.

1.1 Delegation Revocation Through Account Deletion

Figure 7:
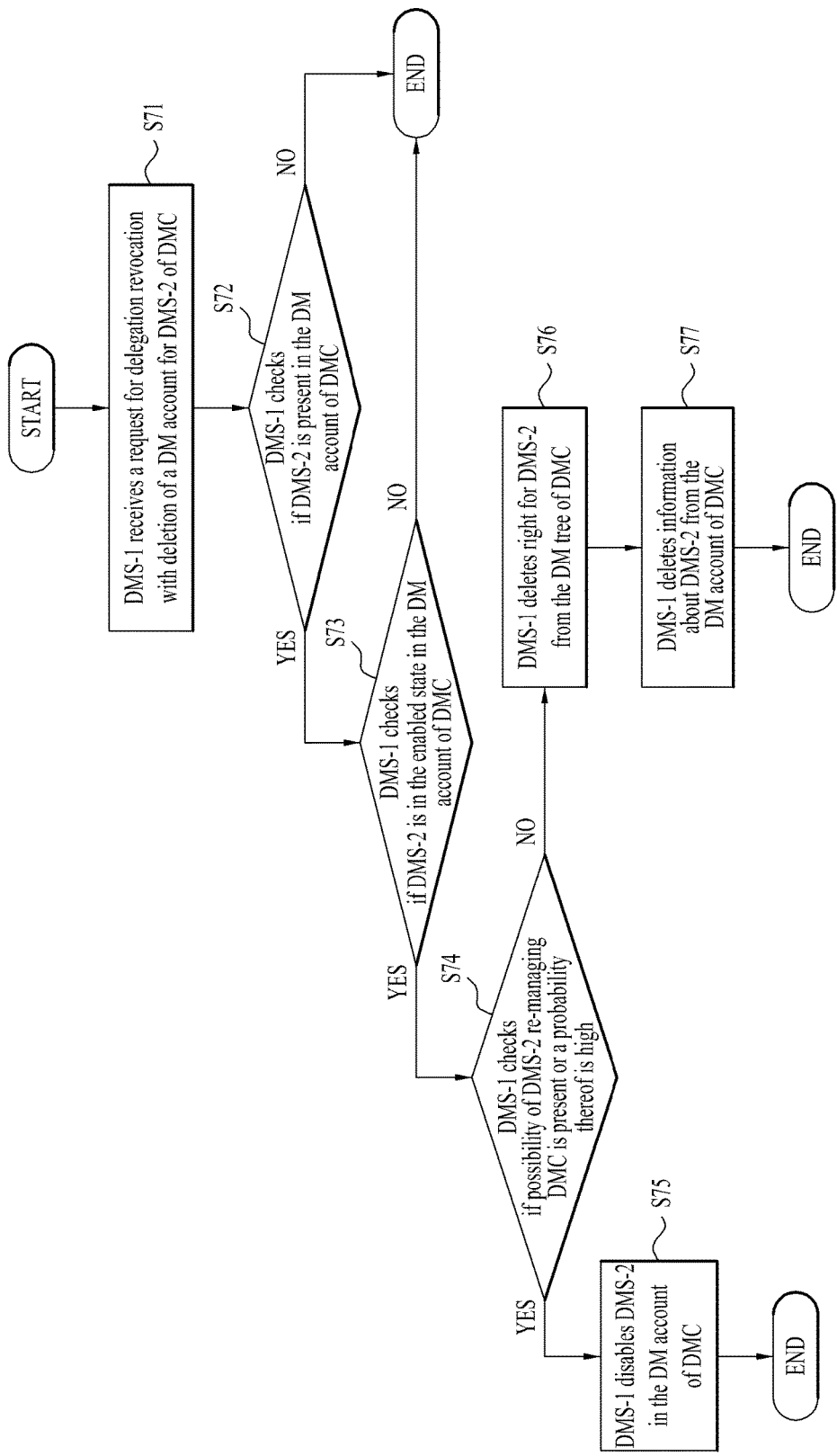
FIG. 7 is a diagram illustrating a delegation revocation process according to one embodiment of the present invention.
Figure 8:
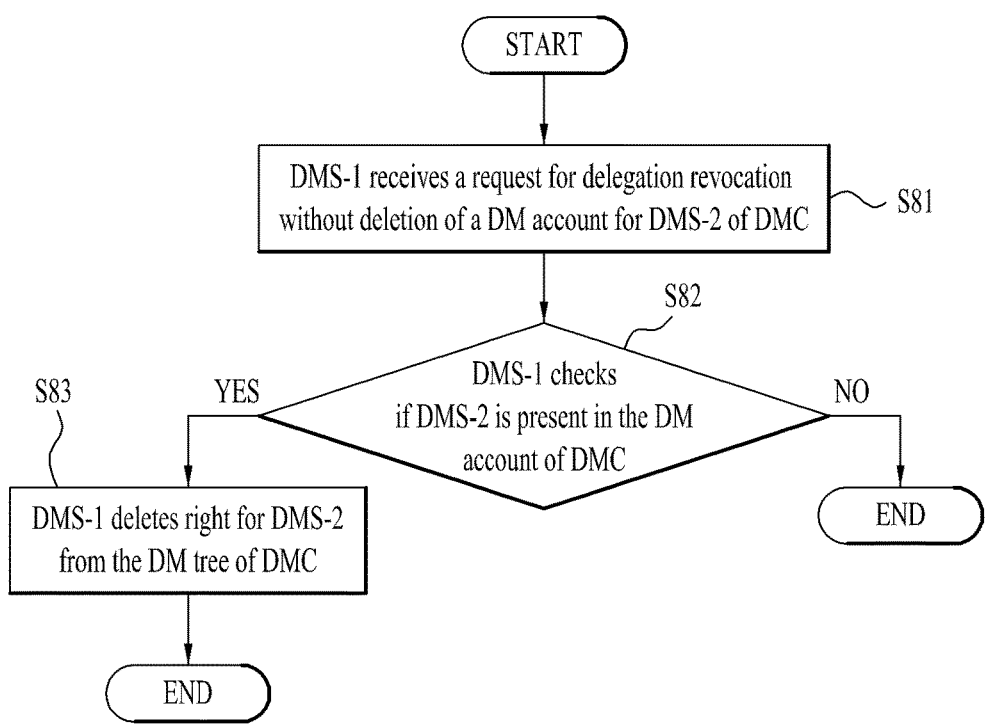
FIG. 8 is a diagram illustrating a delegation revocation process according to one embodiment of the present invention.

In a situation in which delegation revocation has occurred through deletion of an account of a particular server, if it is high possible for the particular server to perform the management function for the corresponding device, the particular server is disabled. Otherwise, the access right and control information of the particular server are deleted from the DM tree, and the information about the particular server is deleted from the DM account. FIG. 7 is a flowchart illustrating these operations.

In an embodiment related to FIG. 7, the delegating server is referred to as DMS-1, and the delegated DMS is referred to as DMS-2.

S71: DMS-1 may receive a request for delegation revocation with account deletion for DMS-2 of a DMC (a DM client, i.e., a client for DM in a device or a terminal).

The above delegation revocation process may be initiated by DMS-1 or by transmitting a message from DMS-2 to DMS-1 or from the DMC to DMS-1.

S72: DMS-1 may check if DMS-2 is present in the DM account of the DMC. If DMS-2 is present in the DM account of the DMC, this process proceeds to S73. If DMS-2 is not present in the DM account of the DMC, this process is terminated.

S73: DMS-1 may check if DMS-2 is in an enabled state in the DM account of the DMC. If DMS-2 is in the enabled state, this process proceeds to S74. If DMS-2 is not in the enabled state, this process is terminated.

S74: DMS-1 may check whether or not it is possible for DMS-2 to re-manage the DMC or whether the probability of DMS-2 re-managing the DMC is high. This process may be based on the policy of DMS-1. To check if the probability is high, a specific threshold may be used. If a specific threshold is used, and the probability is higher than the specific threshold, it may be determined that the probability is high. If it is possible for DMS-2 to re-manage the DMC or the probability thereof is high, this process proceeds to S75. If it is not possible for DMS-2 to re-manage the DMC or the probability of DMS-2 re-managing the DMC is low, this process proceeds to S76.

S75: DMS-1 may disable DMS-2 in the DM account of the DMC.

S76: DMS-1 may delete access right for DMS-2 and control information from the DM tree of the DMC.

S77: DMS-1 may delete information about DMS-2 from the DM account of the DMC (Optional).

In addition, the DMC or DMS-1 may inform DMS-2 of the information (i.e., the DM account deletion, deletion or disablement of access right from the DM tree, or the like) after the process described above.

1.2 Delegation Revocation without Account Deletion

When delegation revocation without deletion of the account of a particular DMS occurs, it may be checked if the DMS is present in the DM account. If the DMS is present in the DM account, the requested access right and control information about DMS-2 may be deleted from the DM tree.

S81: DMS-1 may receive a request for delegation revocation for DMS-2 of the DMC without the account deletion. The process for the delegation revocation without account deletion may be initiated by DMS-1 or by transmitting a message from DMS-2 to DMS-1 or from the DMC to DMS-1. The request may include parameters such as an indicator indicating a MO instance and an indicator indicating that an access right in the DM tree is modified.

S82: DMS-1 may check whether DMS-2 is present in the DM account of the DMC. If DMS-2 is present in the DM account of the DMC, this process proceeds to S83. If DMS-2 is not present in the DM account of the DMC, this process is terminated.

S83: DMS-1 may delete the access right and control information for DMS-2 from the DM tree of the DMC.

If the access right of DMS-2 is not present in the DM tree of the DMC, DMS-1 may delete DMS-2 from the DM account of the DMC.

1.3 Delegation Revocation Request from a Delegated Server

Figure 9:
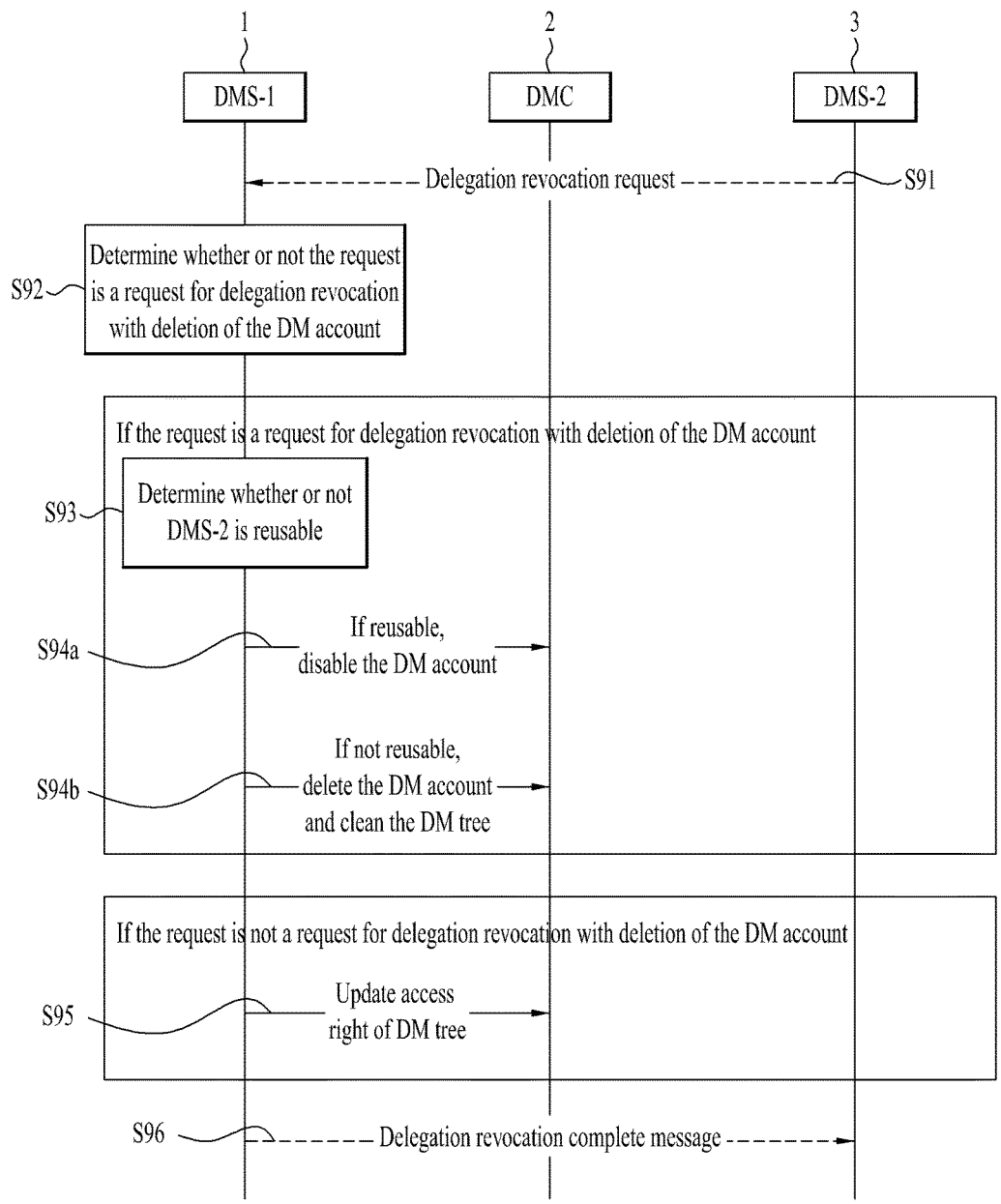
FIG. 9 is a diagram illustrating a delegation revocation process according to one embodiment of the present invention.
Figure 10:
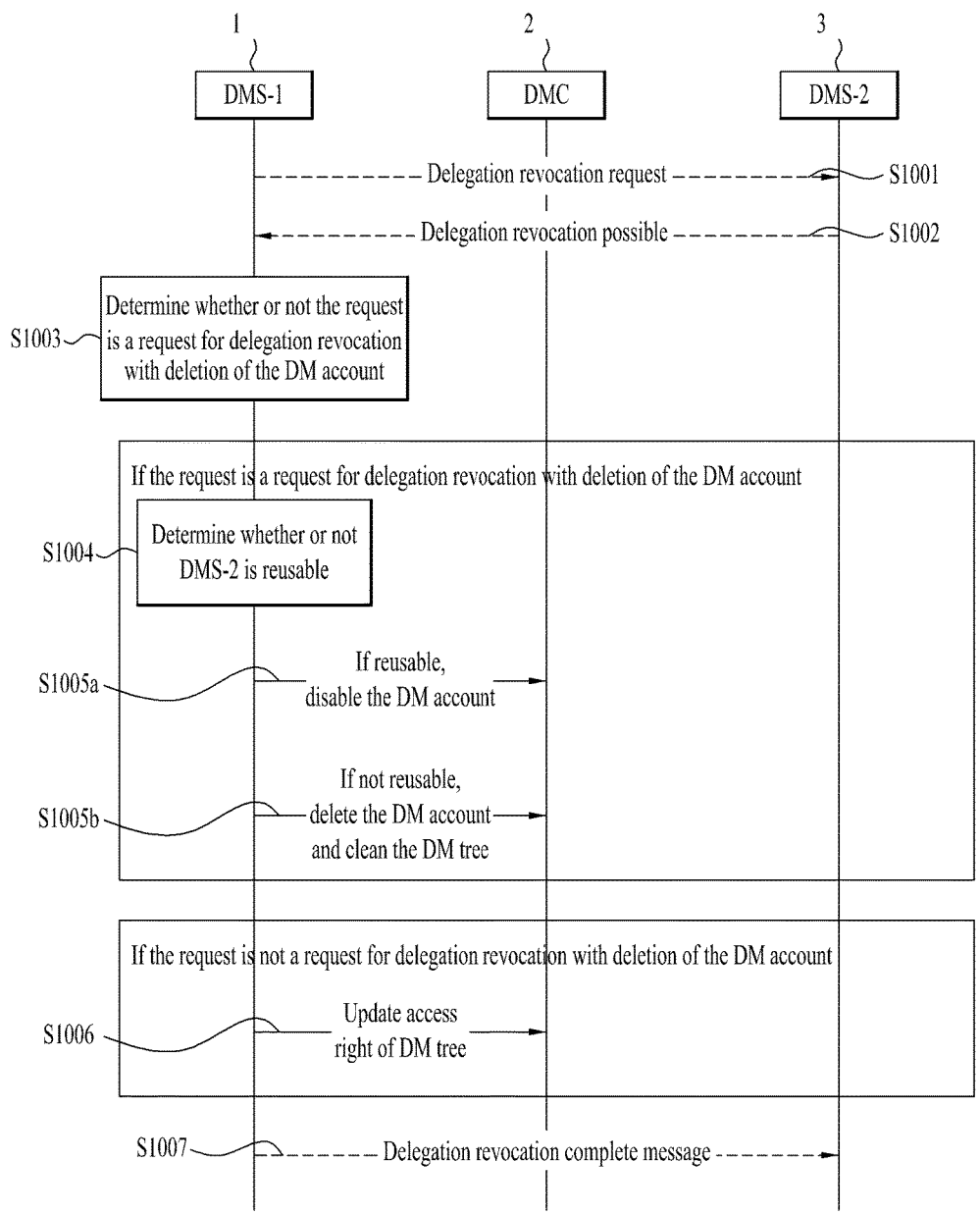
FIG. 10 is a diagram illustrating a delegation revocation process according to one embodiment of the present invention.

FIG. 9 shows a delegation revocation process with account deletion, and a delegation revocation process without account deletion.

In an embodiment related to FIG. 9, the delegating server is referred to as DMS-1, and the delegated DMS is referred to as DMS-2.

S91: Delegation revocation request

DMS-2 may make a request for delegation revocation to DMS-1. The delegation revocation process relevant to FIG. 9 may also be initiated independently by DMS-1 or the DMC.

S92: DMS-1 may determine whether the delegation revocation request includes DM account deletion of DMS-2 from the DMC.

S93: If the delegation revocation request includes DM account deletion, the possibility of DMS-2 re-managing the DMC (a terminal or a device equipped with the DMC) may be determined. That is, it may be determined whether or not DMS-2 is reusable.

S94a: If it is determined that DMS-2 is reusable, DMS-1 may make a request for disablement of the account of DMS-2 to the DMC.

S94b: If it is determined that DMS-2 is not reusable, DMS-1 may request that the DMC delete the account of DMS-2 and clean the relevant DM tree.

S95: If the delegation revocation request does not include DM account deletion, the access to a DM tree corresponding to the delegation revocation request received in S91 may be updated.

S96: DMS-1 or the DMC may inform DMS-2 that the delegation revocation request process has been completed.

1.4 Delegation Revocation Request to the Delegated Server by the Delegating Server S1001: Delegation revocation request DMS-2 may transmit a request for delegation revocation to DMS-1.

S1002: DMS-2 may inform DMS-1 that delegation revocation is possible.

S1003: DMS-1 may determine whether or not the delegation revocation request is delegation revocation request including deletion of the DM account of DMS-2 from the DMC.

S1004: If the delegation revocation request includes DM account deletion, it may be determined whether or not DMS-2 is reusable. That is, the possibility of DMS-2 re-managing the DMC later may be determined.

S1005a: If DMS-2 is reusable, DMS-1 may make a request for disablement of the DM account of DMS-2.

S1005b: If DMS-2 is not reusable, DMS-1 may request that the DM account of DMS-2 be deleted and the access right information corresponding to DMS-2 be deleted from the DM tree.

S1006: If the received delegation revocation request does not include deletion of the DM account of DMS-2 from the DMC, the access to a DM tree corresponding to the delegation revocation request received in S101 may be updated.

S1007: DMS-1 or the DMC may inform DMS-2 that the delegation revocation request process has been completed.

Second Embodiment: New Delegation Method 2.1 New Delegation Process

Figure 11:
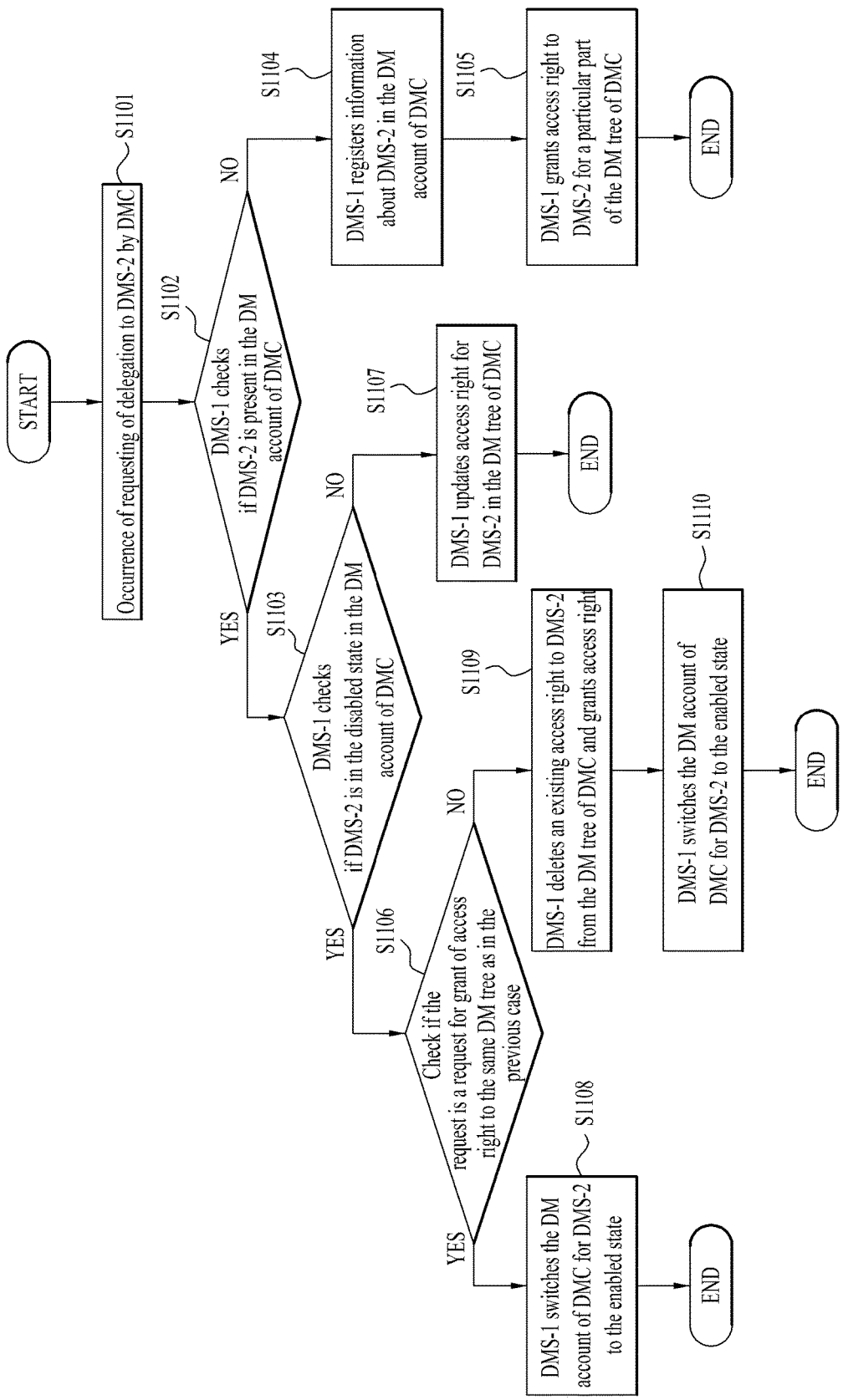
FIG. 11 is a diagram illustrating a delegation procedure according to one embodiment of the present invention.

When delegation request for a particular DMS occurs, it is checked whether the DMS is present in the DM account stored in the DMC and is in the disabled state. If the DMS is present in the DM account and in the disabled state, the DMC enabled the DMS. Otherwise, the existing delegation process is performed. FIG. 11 shows this process.

In an embodiment related to FIG. 11, the delegating server is referred to as DMS-1, and the delegated DMS is referred to as DMS-2. The embodiment related to FIG. 11 includes both a delegation process for a new DMS and a delegation process for a bootstrap DMS.

S1101: Occurrence of delegation request of DMS-2 of the DMC

The delegation process may be initiated by DMS-1 or by transmitting a message from DMS-2 to DMS-1. Parameters contained in the message may include an indicator indicating a MO instance for which DMS-2 desires delegation.

S1102: DMS-1 may check if DMS-2 is present in the DM account of the DMC. If DMS-2 is present in the DM account of the DMC, this process may proceed to S1103. If DMS-2 is not present in the DM account of the DMC, this process may proceed to S1104.

S1103: DMS-1 may check if DMS-2 is in the disabled state in the DM account of the DMC. If DMS-2 is in the disabled state, this process may proceed to S1106. If DMS-2 is not in the disabled state, this process may proceed to S1107.

S1104: DMS-1 may register an account of DMS-2 in the DM account of the DMC.

S1105: DMS-1 may assign an access right to DMS-2 to a particular part of the DM tree of the DMC.

S1106: It may be checked whether the delegation request of S1101 is an access right assignment request for the existing DM tree.

In other words, it may be checked whether the value of the access right assignment request of the delegation request is identical to that of an access right assignment request for the same DM tree as in the conventional cases, namely whether the delegation request requests the same access right and control value for a part of the same DM tree. If the delegation request is an access right assignment request for the same DM tree as in the conventional cases, this process may proceed to S1108. Otherwise, this process may proceed to S1109.

S1107: DMS-1 may update the access right to DMS-2 in the DM tree of the DMC.

S1108: DMS-1 may switch the DM account of the DMC for DMS-2 to the enabled state.

S1109: DMS-1 may delete the existing access right to DMS-2 from the DM tree of the DMC and receive the requested right.

S1110: DMS-1 may switch the DM account of the DMC for DMS-2 to the enabled state.

The DMC or DMS-1 may inform DMS-2 of the information (i.e., the DM account registration, registration or enablement of an access right in the DM tree, or the like) after the process described above.

2.2 Flow of the New Delegation Process

Figure 12:
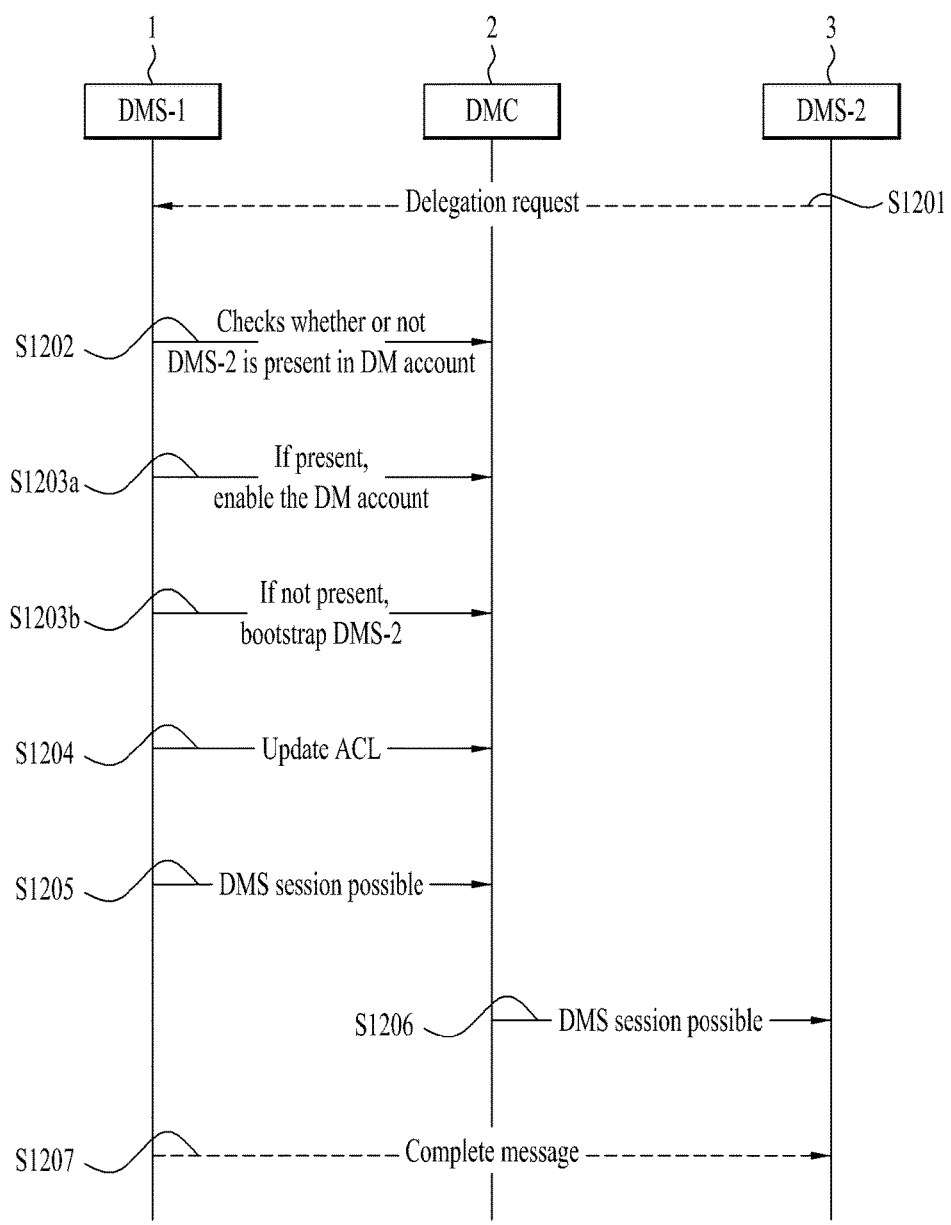
FIG. 12 is a diagram illustrating a delegation procedure according to one embodiment of the present invention.

FIG. 12 illustrates signaling of a new delegation process according to one embodiment of the present invention. In the embodiment related to FIG. 12, the delegating server is referred to as DMS-1, and the delegated DMS is referred to as DMS-2.

S1201: DMS-2 makes a request for delegation to DMS-1. DMS-1 may independently perform the process.

S1202: DMS-1 may check whether or not a DM account for DMS-2 is present in the DMC.

S1203a: If the DM account for DMS-2 is present in the DMC, the DM account may be enabled.

S1203b: If the DM account for DMS-2 is not present in the DMC, DMS-2 may be bootstrapped in the DM account of the DMC.

S1204: The access right of the DM tree in the DMC may be updated according to the delegation request of S1201.

S1205, S1206: DMS-1 may inform DMS-2 that the DM session is possible, through the DMC.

S1207: DMS-1 may transmit, to DMS-2, a message indicating that the delegation process has been completed (Optional).

2.3 Processing of Message Received from DMC

Figure 13:
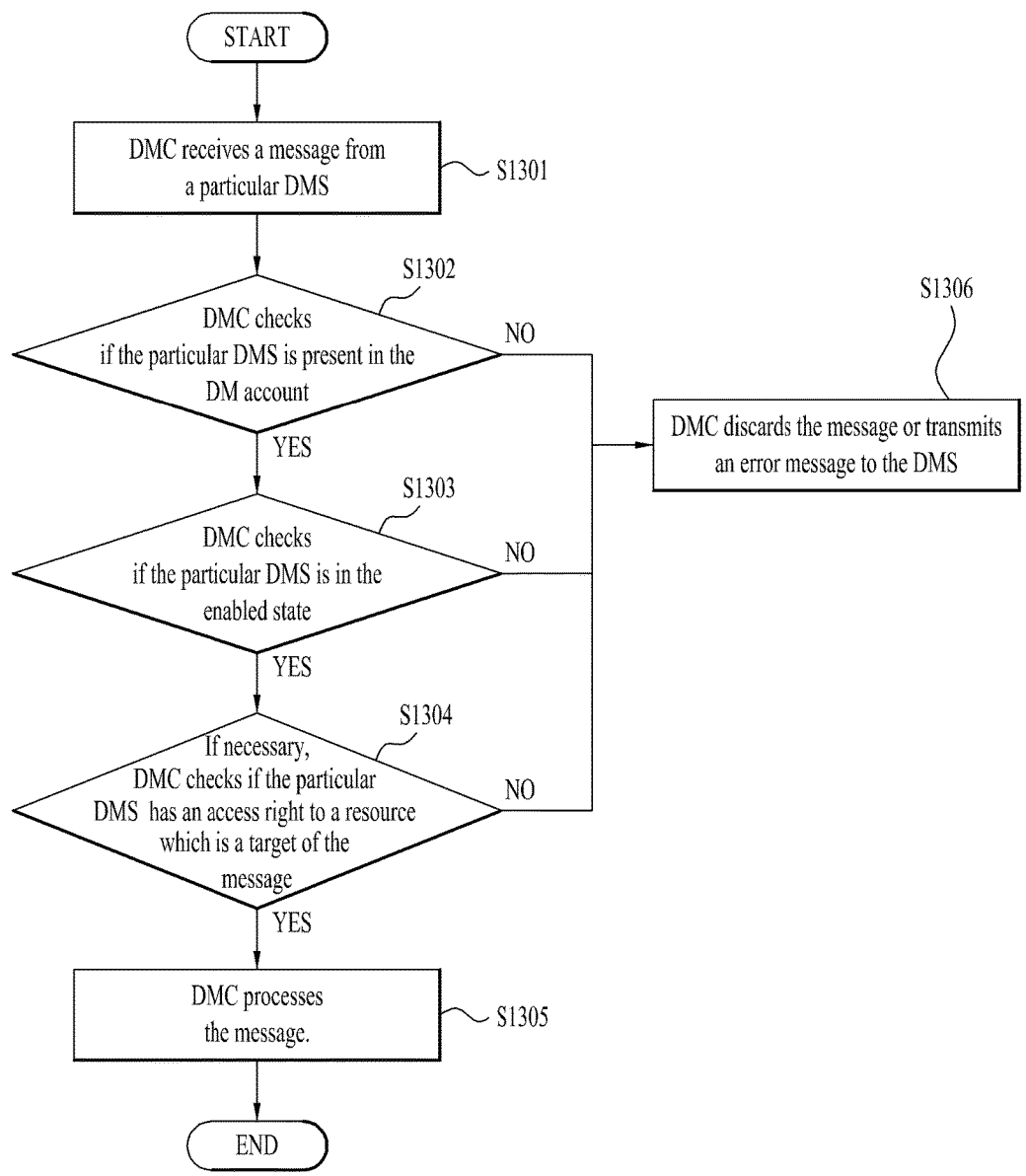
FIG. 13 is a diagram illustrating a procedure for processing a specific message according to one embodiment of the present invention.

FIG. 13 is a flowchart illustrating a message processing method through enablement/disablement of the DM account which is different from the conventional message processing method.

S1301: The DMC may receive a message from a particular DMS.

S1302: The DMC may check whether or not the particular DMS is present in the DM account. If the particular DMS is present in the DM account, this process proceeds to S1303. Otherwise, this process may proceed to S1306.

S1303: The DMC may check whether or not the particular DMS is enabled. If the particular DMS is enabled, this process proceeds to S1304. Otherwise, this process proceeds to S1306.

S1304: If necessary, the DMC may check whether or not the particular DMS has an access right to a target resource of the message. If the message is a message such as a notification message that does not have a target resource, this step may be omitted. If the particular DMS has an access right to the target resource of the message, this process proceeds to S1305. Otherwise, this process proceeds to S1306.

S1305: The DMC may process/execute the message.

S1306: The DMC may discard the message or transmit an error message to the particular DMS.

Third Embodiment: DMS Enablement/Disablement Process without the Delegation Process In this embodiment, a process of enabling or disabling a DMS without the delegation process will be described. In the case in which a DMS capable of enabling a particular DMS requests enablement/disablement of the particular DMS, when an event of the DMC enabling/disabling the particular DMS occurs, enablement/disablement process for the particular DMS may initiated according to the determination by the DMS which is capable of enabling the particular DMS. In addition, depending on the event that occurs, the process may be performed with the DMS having enabled the particular DMS being informed of initiation of the process or without informing the DMS of the event.

When the particular DMS is disabled, a timeout time may be given to the particular DMS to provide a DMS a chance to complete operation on the particular DMC.

Figure 14:
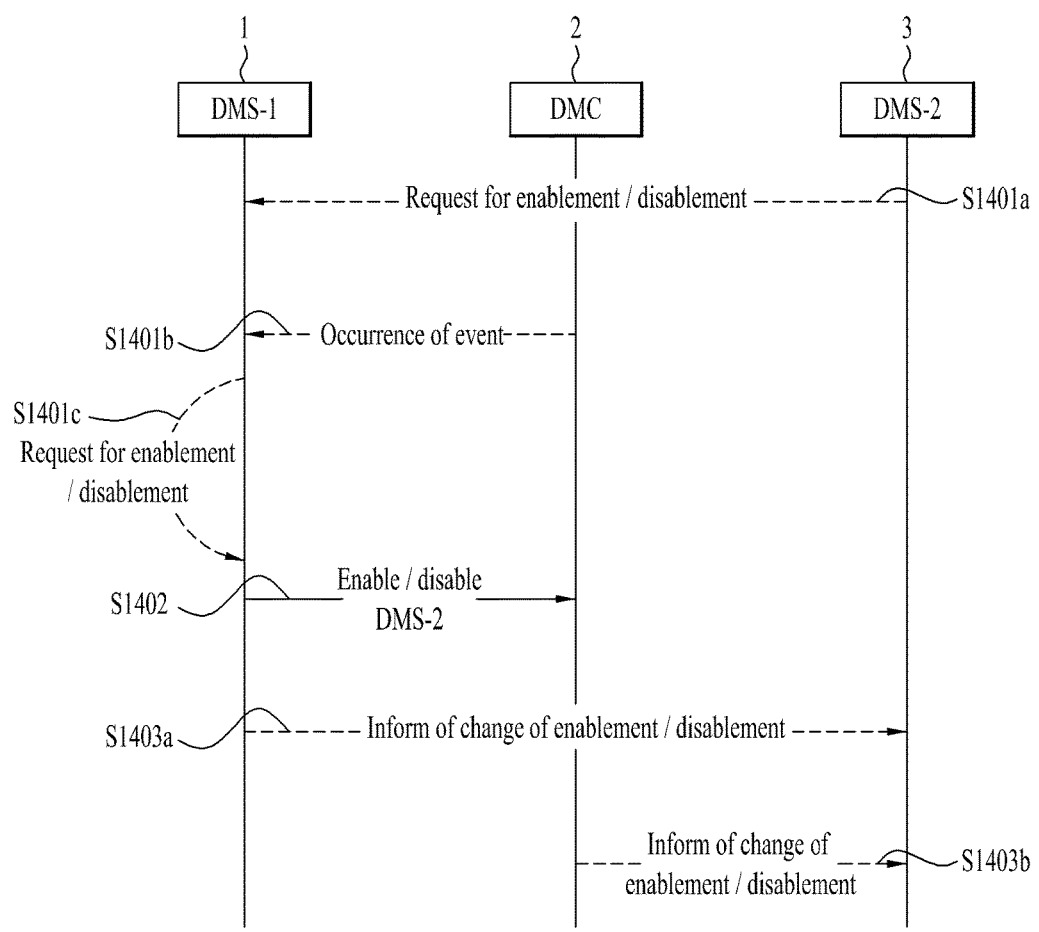
FIG. 14 is a diagram illustrating an enablement/disablement procedure according to one embodiment of the present invention.

3.1 DMS Enablement/Disablement Process without Informing the DMS of Initiation of the Process FIG. 14 illustrates an exemplary case in which a DMS is not informed of initiation of the DMS enablement/disablement process according to one embodiment of the present invention. In an embodiment related to FIG. 14, the DMS to enable a particular DMS is referred to as DMS-1, and the enabled DMS is referred to as DMS-2.

In the embodiment related to FIG. 14, three enablement/disablement process of S1401*a*, S1401*b* and S1401*c* are triggered.

S1401*a*: DMS-2 may make a request for enablement/disablement thereof to DMS-1.

S1401*b*: When an event causing enablement/disablement of DMS-2 occurs in the DMC, the DMC may send the event to DMS-1. An example of notification of occurrence of the event is registration of a trap event by DMS-1. When the trap event occurs, the DMC may make a request for enablement/disablement of DMS-2 to DMS-1.

S1401*c*: DMS-1 may make a request for enablement/disablement of DMS-2 based on its own determination and policy.

S1402: Enablement/disablement of DMS-2

S1402 may be performed when one of S1401*a* to S1401*c* occurs. DMS-1 may deliver an enablement/disablement command about the enabled DMS to the DMC, and the DMC may process the command.

S1403*a* and S1403*b*: the DMC or DMS-1 may inform DMS-2 of whether or not DMS-2 has been enabled/disabled.

Figure 15:
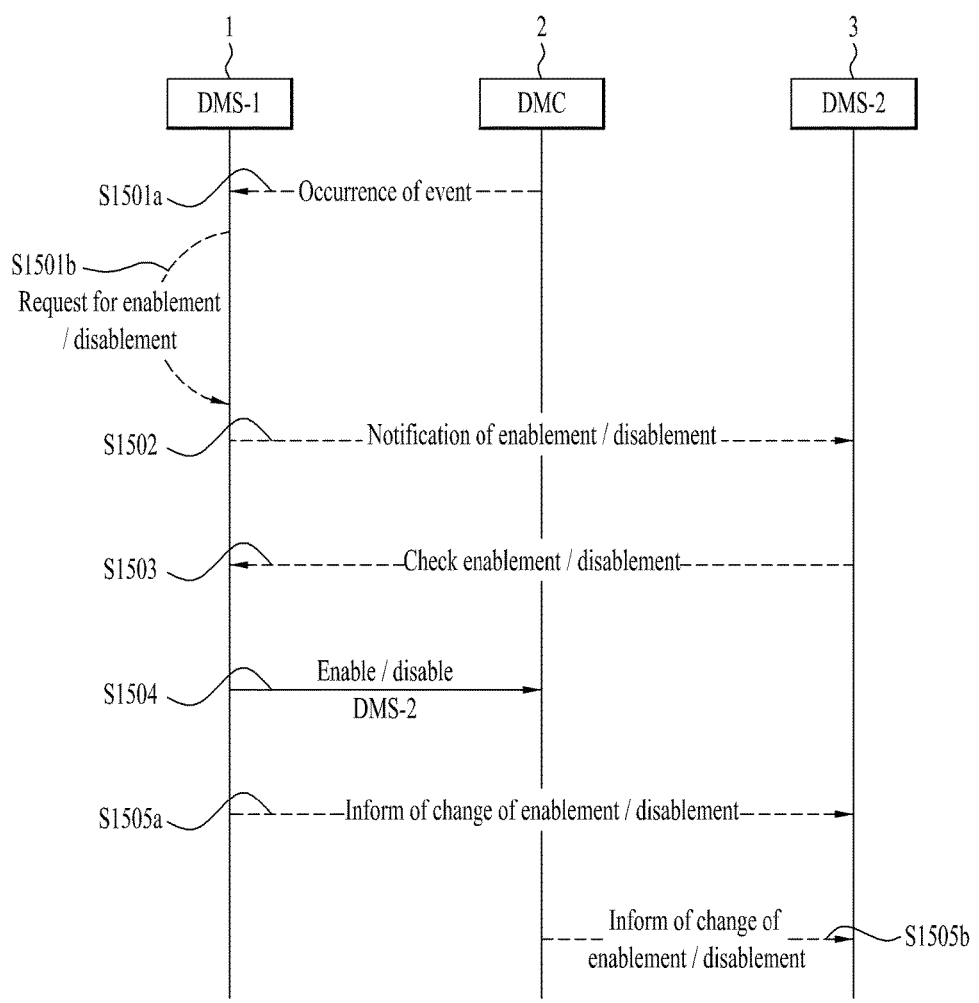
FIG. 15 is a diagram illustrating an enablement/disablement procedure according to one embodiment of the present invention.

3.2 DMS Enablement/Disablement Process with Informing the DMS of Initiation of the Process FIG. 15 illustrates an exemplary case in which a DMS is informed of initiation of the DMS enablement/disablement process according to one embodiment of the present invention. In an embodiment related to FIG. 14, the DMS to enable a particular DMS is referred to as DMS-1, and the enabled DMS is referred to as DMS-2.

Step 1501*a*: An event causing enablement/disablement of DMS-2 may occur in the DMC, the DMC may send the event to DMS-1. In the case of notification of occurrence of the event, DMS-1 may register this trap event. When the trap event occurs, the DMC may make a request for enablement/disablement of DMS-2 to DMS-1.

S1501*b*: DMS-1 may make a request for enablement/disablement of DMS-2 through to its own logic such as determination and policy.

S1502: DMS-1 or the DMC may inform DMS-2 that DMS-2 will be enabled/disabled.

S1503: DMS-2 may inform DMS-1 that DMS-2 can be enabled/disabled.

S1504: Enablement/disablement of DMS-2

This step is performed when S1501*a*, S1501*b* or S1501*c* occurs. DMS-1 may deliver an enablement/disablement command about DMS-2 to the DMC, the DMC may process the command.

S1505*a* and S1505*b*: the DMC or DMS-1 may inform DMS-2 of whether or not DMS-2 has been enabled/disabled.

Fourth Embodiment: DMS Enablement/Disablement Based on a Condition

In the case of the DMS enablement/disablement that frequently occurs, the DMS enablement/disablement mostly occurs according to a particular condition. For example, a terminal or a device may be enabled in a building of a company and managed by the DMS of the company, and may be disabled outside the building of the company and released from the management of the DMS. When such particular conditions are met, the DMS may be enabled/disabled. When such particular conditions are not met, the DMS maybe enabled/disabled.

In addition, when a particular condition is met, accounts of all servers registered in the DMC may be enabled/disabled.

4.1 Condition-Based DMS Enablement

This process may be performed when an event of the DMC enabling a particular DMS occurs. When the event occurs in the DMC, the DMC may switch the DMS to the enabled state. For example, when a terminal or a device is taken into a building of a company, the DMC may check the location of the terminal or the device and enable the DMS of the company.

Thereafter, the DMS may be informed that the DMC has accessed thereto according to settings, or may set desired initial settings. For example, when an event for enabling the company DMS occurs, the company DMS may be enabled. The DMS may be informed that the DMS is enabled, initial settings of the DMS (e.g., camera disablement, etc.) may be established. In setting initial settings of the DMS, a terminal or a device may perform this operation on its own, may set the initial settings by receiving a command from the DMS. The condition-based DMS enablement may be performed directly by the DMC, or through the enabled DMS.

Figure 16:
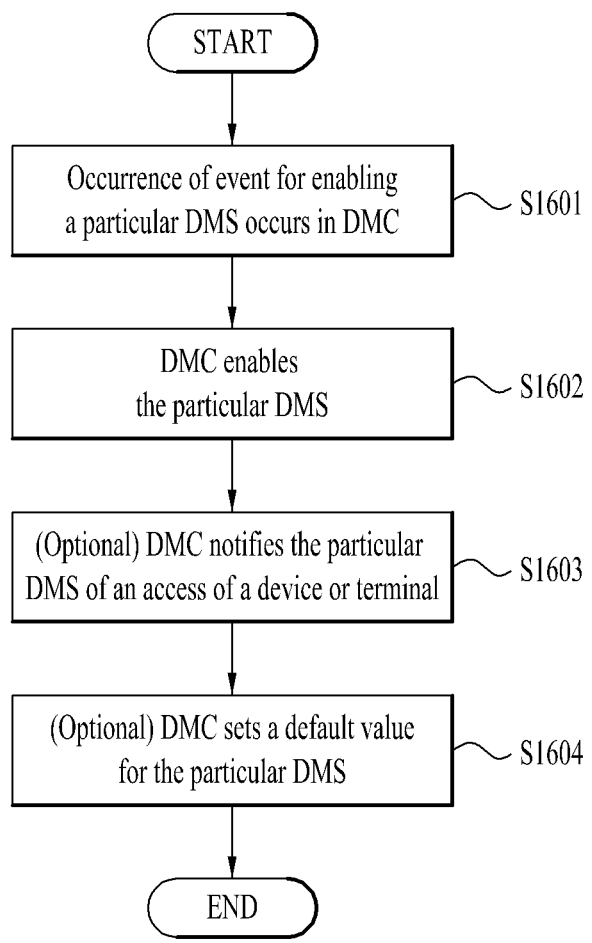
FIG. 16 is a diagram illustrating an enablement procedure according to one embodiment of the present invention.

FIG. 16 illustrates a condition-based DMS enablement performed by a DMS according to one embodiment of the present invention.

S1601: An event of the DMC enabling the account of a particular DMS occurs.

S1602: The DMC may switch the account of the particular DMS to the enabled state. Depending on the event of enablement in S1601, a plurality of DMS accounts may be switched to the enabled state.

S1603: (Optional) The DMC may inform the DMS of access of a terminal or a device.

S1604: (Optional) The DMC may set a default value which is pre-stored for the DMS.

In an embodiment related to FIG. 16, the sequential order of S1603 and S1604 indicated by "Optional" may change.

Figure 17:
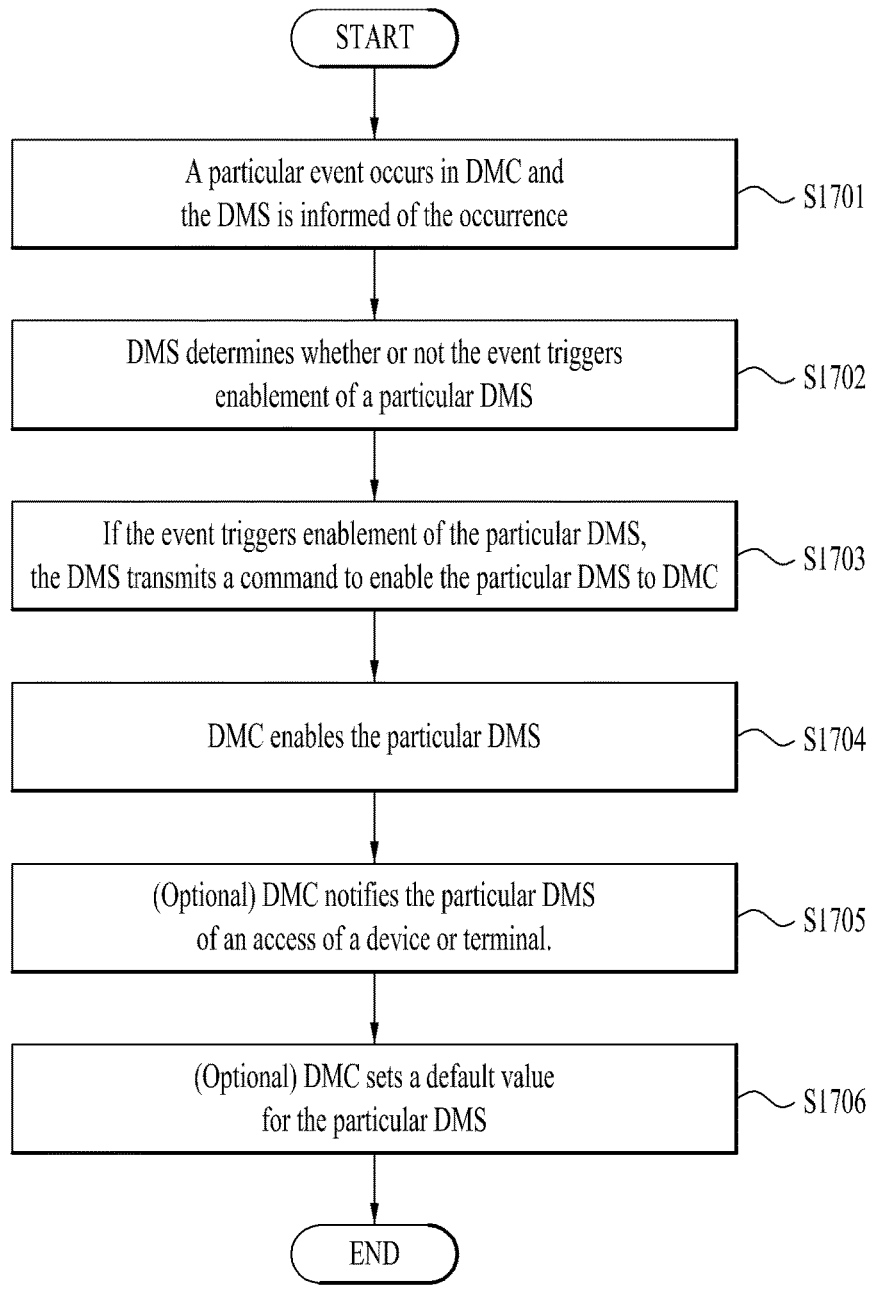
FIG. 17 is a diagram illustrating an enablement procedure according to one embodiment of the present invention.

FIG. 17 illustrates a condition-based DMS enablement performed by the DMS according to one embodiment of the present invention.

S1701: A particular event occurs in the DMC. The DMS may set to be informed of this event, and thus the DMC may inform the DMS of occurrence of the event.

S1702: The DMS may check if the event meets a condition for enabling a particular DMS.

S1703: If the condition is met, the DMS may transmit a command to enable the particular DMS to the DMC.

S1704: The DMC may switch the DM account of the particular DMS to the enabled state. The particular DMS may include a plurality of DMSs, and include all DMSs stored in the server account of the DMC.

S1705: (Optional) The DMC may inform the DMS of access of a terminal or a device.

S1706: (Optional) The DMC may set the default value for the DMS.

In an embodiment related to FIG. 17, the sequential order of S1705 and S1706 indicated by "Optional" may change.

4.2 Condition-Based DMS Disablement

This embodiment may be implemented when an event of the DMC disabling a particular DMS occurs. When the event occurs in the DMC, the DMC may switch the DMS to the disabled state. For example, when a terminal or a device moves out of the building of a company, the DMC may check the location of the terminal or the device and disable the company DMS.

Thereafter, depending on settings, the DMS may be informed that access of the DMC has been cancelled. The DMS may set a cancellation setting. For example, when an event for disabling a company DMS occurs, the company DMS may be disabled. The DMS may be informed of the disablement, a cancellation setting (e.g., camera enablement, etc.) for the DMS may be set.

The device or the terminal may set the cancellation setting for the DMS on its own or may set the cancellation setting by receiving a command from the DMS or another DMS. The condition-based DMS disablement may be performed directly by the DMC or through the enabled DMS.

Figure 18:
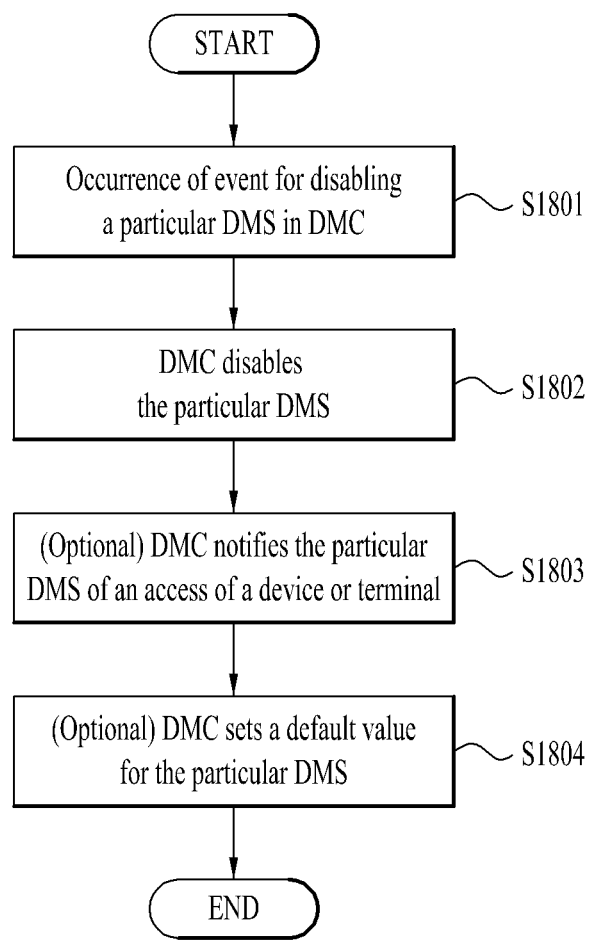
FIG. 18 is a diagram illustrating a disablement procedure according to one embodiment of the present invention.

FIG. 18 illustrates a condition-based DMS disablement performed by the DMC according to one embodiment of the present invention.

S1801: An event of the DMC switching the DM account of a particular DMS to the disabled state occurs.

S1802: The DMC may switch the DM account of the particular DMS to the disabled state. Depending on the event of switching to the disabled state in S1801, a plurality of DMS accounts may be switched to the enabled state.

S1803: (Optional) The DMC may inform the DMS of cancellation of access of a terminal or a device.

S1804: (Optional) The DMC may set a cancellation setting value for the DMS.

In an embodiment related to FIG. 18, the sequential order of S1803 and S1804 indicated by "Optional" may change.

Figure 19:
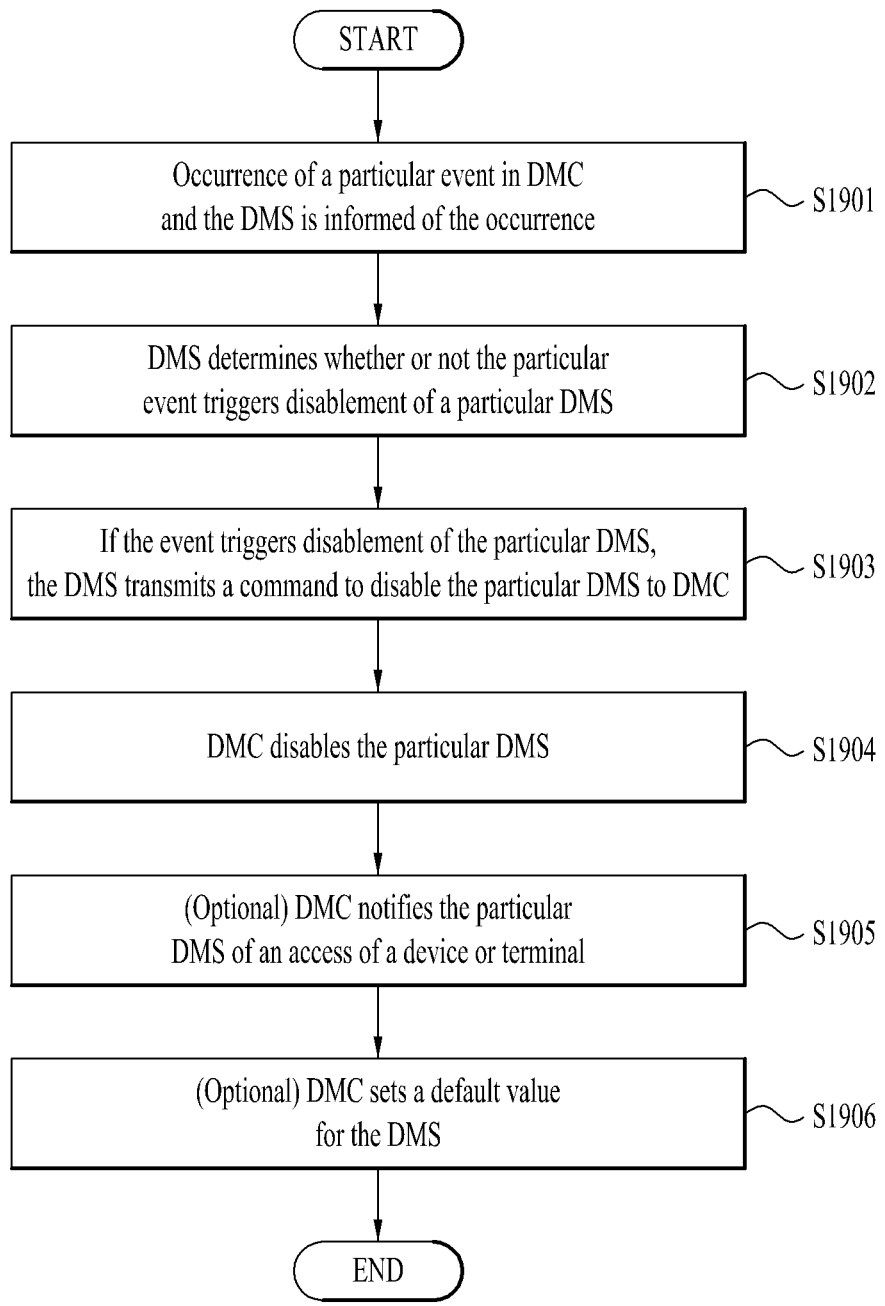
FIG. 19 is a diagram illustrating an enablement procedure according to one embodiment of the present invention.

FIG. 19 illustrates a condition-based DMS disablement performed by a DMS according to one embodiment of the present invention.

S1901: A particular event occurs in the DMC. A DMS may be set to be informed of occurrence of the event, the DMC may inform the DMS of occurrence of the event.

S1902: The DMS may check the event occurring in S1901 meets a condition for disabling a particular DMS.

S1903: When the condition for disabling the particular DMS is met, the DMS may transmit a command to disable the particular DMS to the DMC.

S1904: The DMC may switch the DM account of the particular DMS to the disabled state. Depending on the event occurring in S1902, a plurality of DMS accounts may be switched to the enabled state.

S1905: (Optional) The DMC may inform the DMS of cancellation of access of a terminal or a device.

S1906: (Optional) The DMC may set a cancellation setting value for the DMS.

In an embodiment related to FIG. 19, the sequential order of S1905 and S1906 indicated by "Optional" may change.

4.3 Process of Restoring the Default Value

If an event of disabling a particular DMS does not occur, the terminal or device may maintain settings set by the DMS. For example, when the terminal or device managed by a company DMS is turned off, moved out of the company building, and then turned on, the existing default settings (e.g., camera disablement, etc.) remain set in the terminal or device since the event of moving out of the company has not occurred. To prevent this from occurring, the power may be turned on, the state of the terminal or device may be periodically checked, or interaction with the user may be performed such that the DMS is disabled or a default value is restored.

Fifth Embodiment: Technique for Safe DMS Enablement/Disablement 5.1 Method for Maintaining the Enabled DMS Over the Current Session and Disabling the DMS According to this technique, in processing a message received from a DMS, it is checked whether a source DMS is enabled only for a notification message (pkg #0, Notification) rather than for all the messages.

5.1.1 Processing of Notification Message

Figure 20:
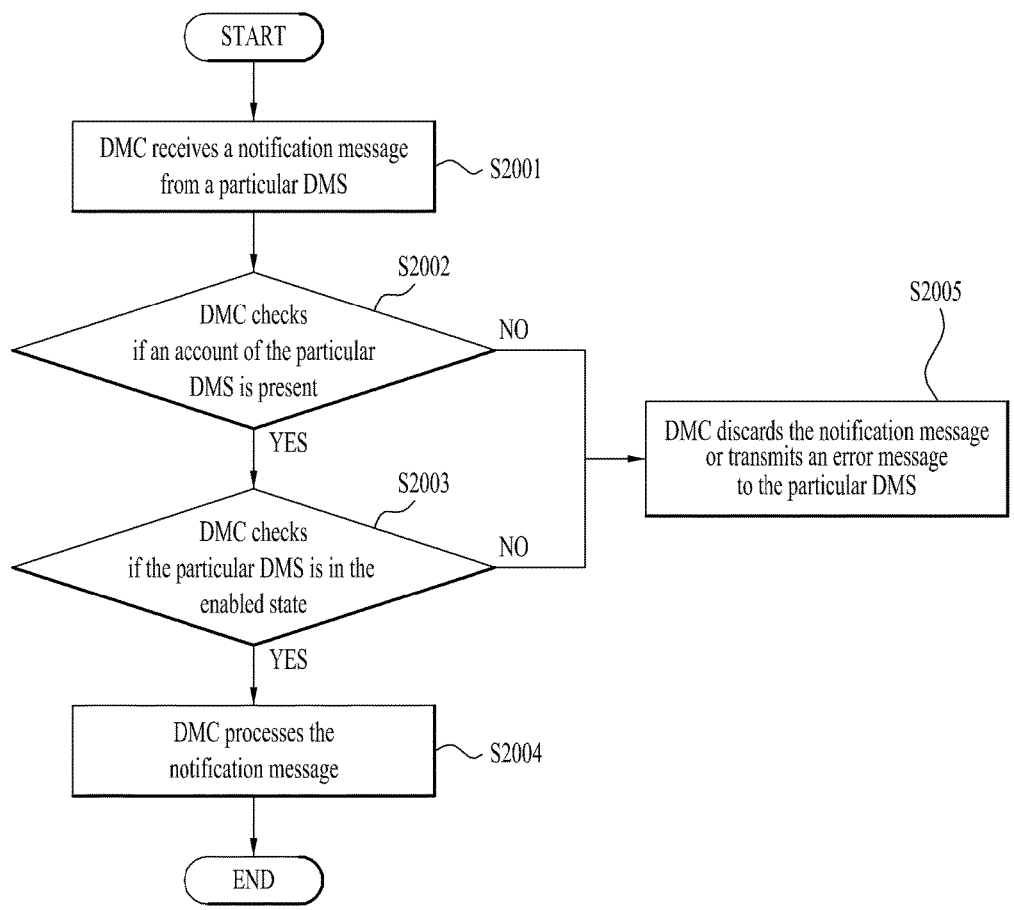
FIG. 20 is a diagram illustrating a procedure for processing a particular message according to one embodiment of the present invention.

FIG. 20 illustrates processing of a notification message according to one embodiment of the present invention.

S2001: The DMC may receive a notification message from a particular DMS.

S2002: The DMC may check presence or absence of the account of the DMS. If the account of the DMS exists, this process proceeds to S2003. Otherwise, this process may proceed to S2005.

S2003: The DMC may check whether or not the DMS is in the enabled state. If the DMS is in the enabled state, this process proceeds to S2004. Otherwise, this process may proceed to S2005.

S2004: The DMC may process the notification message.

S2005: The DMC may discard the notification message or transmit an error message to the DMS.

5.1.2 Processing of Management Message

Figure 21:
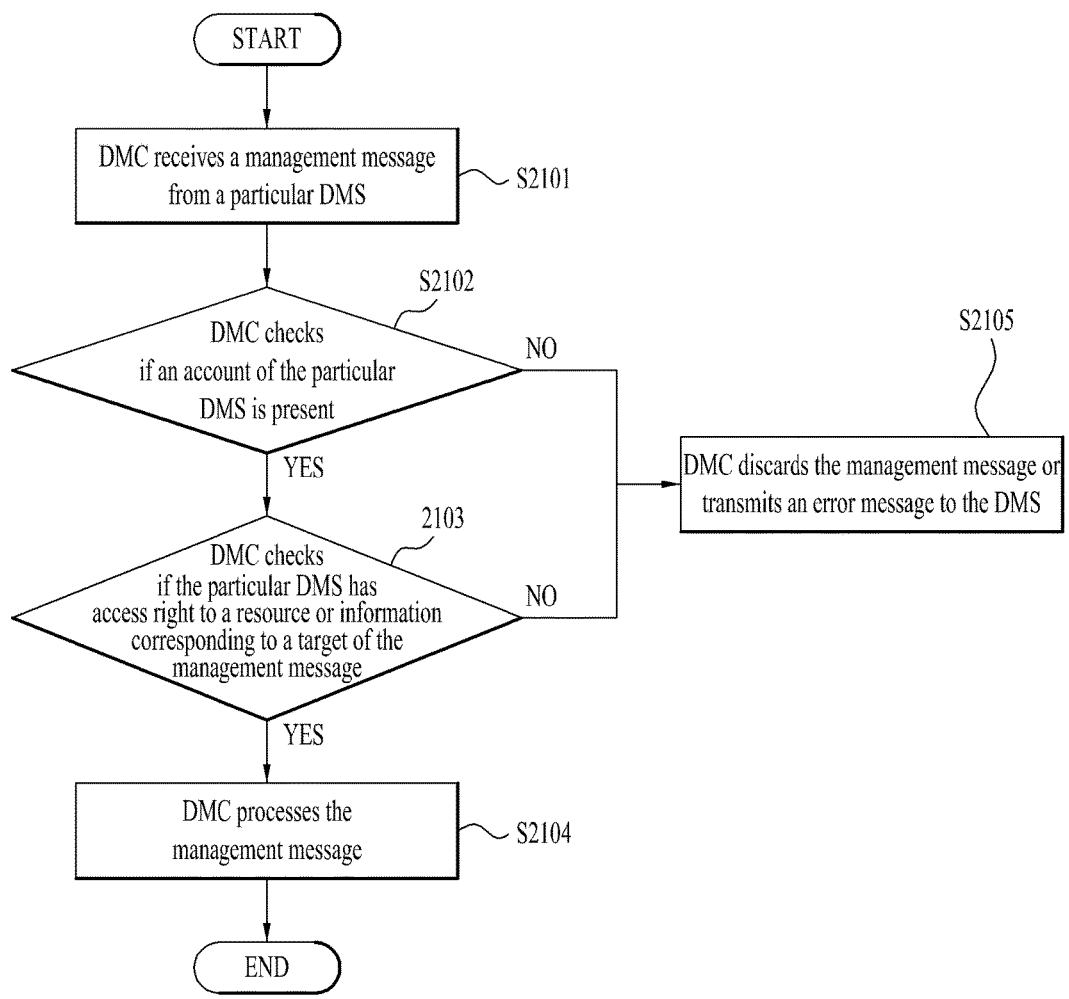
FIG. 21 is a diagram illustrating a procedure for processing a particular message according to one embodiment of the present invention.

FIG. 21 illustrates processing of a management message according to one embodiment of the present invention.

S2101: The DMC may receive a management message from a particular DMS.

S2102: The DMC may check whether or not the account of the DMS exists. If the account of the DMS exits, this process proceeds to S2103. Otherwise, this process may proceed to S2105.

S2103: The DMC may check if the DMS has an access right to a resource or information corresponding to a target of the management message. If the DMS has the access right to the resource or information corresponding to the target of the management message, this process proceeds to S2104. Otherwise, this process may proceed to S2105.

S2104: The DMC may process the management message.

S2105: The DMC may discard the management message or transmit an error message to the DMS.

5.2 Method for Informing the Enabled DMS of Disablement Thereof.

When the condition for disabling the DMS is met, the enabled DMS (DMS-2) may be informed of this condition such that the current process is safely terminated. The enabled DMS may transmit, to the enabling DMS (DMS-1), an Acknowledgement message indicating that the current process can be disabled. DMS-2 may directly communicate with DMS-1 or communicate with DMS-1 via a device or a terminal (or a DMC).

Sixth Embodiment: Technique of Temporary Delegation Through New DMS Bootstrap This technique is useful in temporarily assigning an access right for a particular MO(s) to a DMS bootstrapped in the DMC. In the case of the conventional method, the delegated DMS is a DMS to manage SCOMO. In temporarily managing an FUMO, when an access right to the FUMO is assigned to the DMS, and delegation revocation needs to be performed for the FUMO, the delegation revocation process can be performed using only a non-standardized method such as leaving logging since trace information about delegation does not exist.

Figure 22:
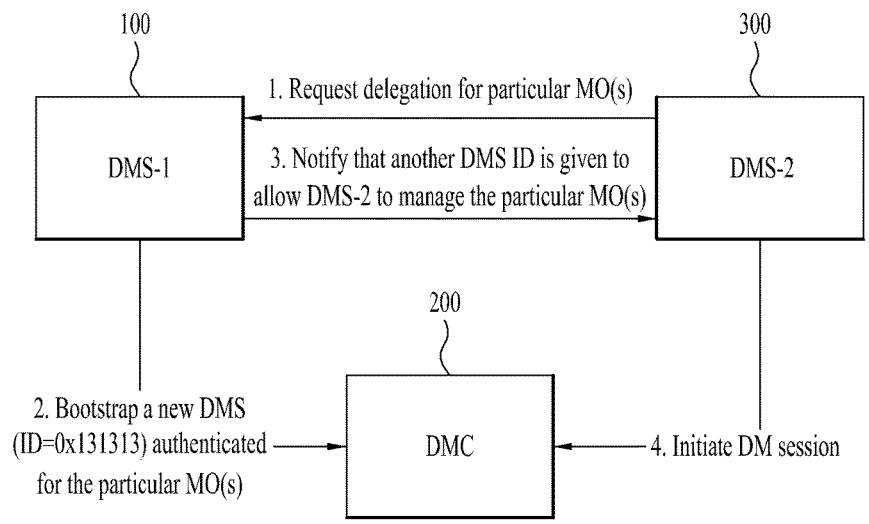
FIG. 22 is a diagram illustrating a delegation procedure according to one embodiment of the present invention.

With the technique of this embodiment, a new DMS to manage the FUMO is bootstrapped in the DMC, and the delegated DMS is informed of creation of an additional DM account in the DMC, such that the delegated DMS may manage the FUMO of the DMC through the new DM account (i.e, a new DMS ID). FIG. 22 illustrates a temporary delegation technique.

Step 1: A delegation request is made for a particular MO(s). The delegation process may be initiated by the delegating DMS (i.e., DMS-1 100) or the delegated DMS (i.e., DMS-2 300).

Step 2: DMS-1 may bootstrap information about a new DMS in the DMC rather than bootstrapping information about DMS-2 corresponding to the ID of DMS-2, and may also assign an access right for a particular MO(s) to DMS-2.

Step 3: DMS-1 may inform DMS-2 of the ID of the new bootstrapped DMS and/or information about a new DMS account.

Step 4: DMS-2 may access the particular MO(s) of the DMC using the DMS ID of which DMS-1 has informed rather than using the ID thereof.

Seventh Embodiment: DM 2.0 Standard Management Object

Figure 23:
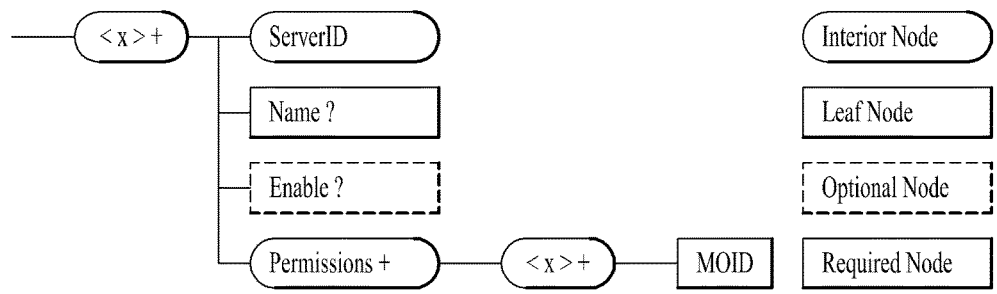
FIG. 23 is a diagram schematically illustrating the form of a management object according to one embodiment of the present invention.

FIG. 23 is a diagram schematically illustrating the form of a management object according to one embodiment of the present invention. Each node is described below. Node <x> may be represented as follows.

TABLE 1

| Status | Occurrence | Format | Min. Access Types |
|---|---|---|---|
| Required | OneOrMore | Node | Get |

Node <x>, which is an interior node, operates as a placeholder for at least one instance of a corresponding management object. The management object identifier of the management object needs to be "urn:oma:mo:oma-dm-dmacc:2.0".

A node ServerID may be represented as the following.

TABLE 2

| Status | Occurrence | Format | Min. Access Types |
|---|---|---|---|
| Required | One | chr | Get |

The node ServerID specifies a server identifier for a management server that is used in a management session. This identifier needs to be unique within the DM client.

Node Name may be represented as the following.

TABLE 3

| Status | Occurrence | Format | Min. Access Types |
|---|---|---|---|
| Required | ZeroOrMore | Chr | Get |

The node Name specifies a user indicatable name for a management server.

The node Enable may be represented as the following.

TABLE 4

| Status | Occurrence | Format | Min. Access Types |
|---|---|---|---|
| Required | ZeroOrOne | Int | Get |

The node Enable specifies whether or not the DM server is enabled or disabled. However, to safely disable the DM server (during, for example, firmware update), there is provided an option of disabling the DM server after the current session.

If the value of the Enable node is 0 or the Enable node does not exist, the corresponding DM client processes a message transmitted from the DM server. The DM client is allowed to initiate a DM session with the DM server and transmission of the message is allowed. If the value of the Enable node is 1, the DM client discards all messages transmitted from the DM server. The DM client is not allowed to initiate a DM session with the DM server to transmit the messages. If the value of the Enable node is 2, the DM client discards only the notification message transmitted from the DM server. The DM client is not allowed to initiate a DM session with the DM server. The table below includes numerical values associated with respective report channels.

TABLE 5

| Values | Description |
|---|---|
| 0 | Enabled |
| 1 | Disabled with discarding all the message |
| 2 | Disabled with discarding Notification |

The Permissions node may be represented as the following.

TABLE 6

| Status | Occurrence | Format | Min. Access Types |
|---|---|---|---|
| Required | OneOrMore | node | Get |

The Permissions node is a parent node for a management object for which a corresponding DM server requests an access right. The Permissions node and all child nodes thereof should not be exposed to the DM client. This part is used only for bootstrapping.

The Permissions/<y> node may be represented as the following.

TABLE 7

| Status | Occurrence | Format | Min. Access Types |
|---|---|---|---|
| Required | OneOrMore | Node | Get |

Permissions/<y> node specifies an access right for a particular MOID.

Permissions/<y>/MOID node may be represented as the following.

TABLE 8

| Status | Occurrence | Format | Min. Access Types |
|---|---|---|---|
| Required | One | Chr | Get |

Permissions/<y>/MOID node specifies a MOID for this group.

Eighth Embodiment: Timeout-Based Server Account Enablement/Disablement

According to one embodiment of the present invention, a server account may be temporarily enabled or disabled through timeout. That is, when a particular server account is disabled, the timeout may be specified such that the particular server account is disabled by the timeout time, and then automatically enabled after the timeout. When a client (a device or a terminal) is in the disablement, it cannot transmit nay message to the server, and may ignore all messages received from the server. The client may be immediately disabled, or may be disabled after maintenance of the current access or session.

When a particular server is disabled, access or session of a sub-network used for the current access or session may be closed.

When the particular server is disabled, all functions performed by the particular server may be interrupted or the particular server may be allowed to perform the functions but not allowed for access, depending on the settings or system. In the case in which a particular function is performed during the timeout period, when a device or a terminal is enabled and reconnected to the server, collected information about the performed function (e.g., a resultant of the function, etc.) may be transmitted. Alternatively, the collected information may be stored in a particular place and retrieved by the server.

The timeout may be specified when the particular server is disabled. If the timeout is not specified, the default timeout may be used.

All server accounts may be enabled/disabled by changing one value. That is, there may be a resource (or a node) which is capable of performing enablement/disablement of all the server accounts, and all the server account may be enabled/disabled through the resource. When the entirety of the server accounts is disabled, the timeout may be specified. If the timeout is specified, all servers may be disabled for the timeout time.

An example of the resource will be described. An LWM2M (Lightweight M2M) server object provides information related to an LWM2M server, an initial access right, security-related data. The object information is given as the following.

TABLE 9

| Object | Object ID | Object URN | Multiple Instances? |
|---|---|---|---|
| LWM2M Server | 1 | | Yes |

TABLE 10

| Resource Name | Resource ID | Access Type | Multiple Instances? | Mandatory? | Type | Range or Enumeration | Units | Descriptions |
|---|---|---|---|---|---|---|---|---|
| LWM2M Server URI | 0 | R, W | No | | String | 0-255 bytes | — | Uniquely identifies the LWM2M Server, and is in the form: "coaps://host:port", where host is an IP address or FQDN, and port is the UDP port of the Server. |
| Lifetime | 1 | R, W | No | | Integer | 32-bit | s | Specify the lifetime of the registration in seconds. |
| Security Mode | 2 | R | No | | Integer | 8-bit | — | Determines which security mode of DTLS is used 0: Pre-Shared Key mode 1: Raw Public Key mode 2: Certificate mode |
| Security Key | 3 | R | No | | Binary | Variable | — | Stores security key of security mode. The format of the keying material is defined by the security mode. |
| Short Server ID | 4 | R | No | | Unsigned Integer | 8-bit | — | Short integer ID, assigned by the LWM2M Client. This identifier uniquely identifies each LWM2M Server configured for the LWM2M Client. default Short Server ID (i.e. 0) |

TABLE 10-continued

| Resource Name | Resource ID | Access Type | Multiple Instances? | Mandatory? | Type | Range or Enumeration | Units | Descriptions |
|---|---|---|---|---|---|---|---|---|
| Default Minimum Period | 5 | R, W | No | | Unsigned Integer | 16-bit | s | MUST not be used for identifying the LWM2M Server The default value the Client should use for the Minimum Period of an Observation in the absence of this parameter being included in an Observation. If this Resource doesn't exist, the default value is 1. |
| Default Maximum Period | 6 | R, W | No | | Unsigned Integer | 16-bit | s | The default value the Client should use for the Maximum Period of an Observation in the absence of this parameter being included in an Observation. |
| Disable | 7 | E | No | | | | | If this Resource is executed, this LWM2M Server Object is disabled for a certain period defined in the Disabled Timeout Resource. In this period, the LWM2M Client MUST NOT send any message to the Server and ignore all the messages from the Server. When disabled, Client MUST perform de-registration process and underlying network connection between the Client and Server MUST be disconnected. |
| DisableTimeout | 8 | R, W | No | | Unsigned Integer | 32-bit | s | A period to disable the Server. After this period, the LWM2M Client MUST perform registration process to the Server. If this Resource is not set, a default timeout value is 86400 (1 day). |
| Notification Storing When Disabled or Offline | 9 | R, W | NO | | Boolean | 1-bit | | If true, the LWM2M Client stores Observe Notifications to the LWM2M Server while the LWM2M Server account is disabled or the Client is offline. After the LWM2M Server account is enabled or the Client is online, the LWM2M Client reports the stored Notifications to the Server. If false, the LWM2M Client discards all the Observe Notifications or temporally disables the Observe function while the LWM2M Server is disabled or the Client is offline. The default value is true. The maximum number of storing Notification per the Server is up to the implementation. |
| Binding Preference | 10 | R, W | No | | Integer | 0-3 | | This resource defines the transport binding and mode preferred by the Client for this Server. 0: UDP 1: UDP with Queue Mode 2: SMS 3: SMS with Queue Mode |

Figure 24:
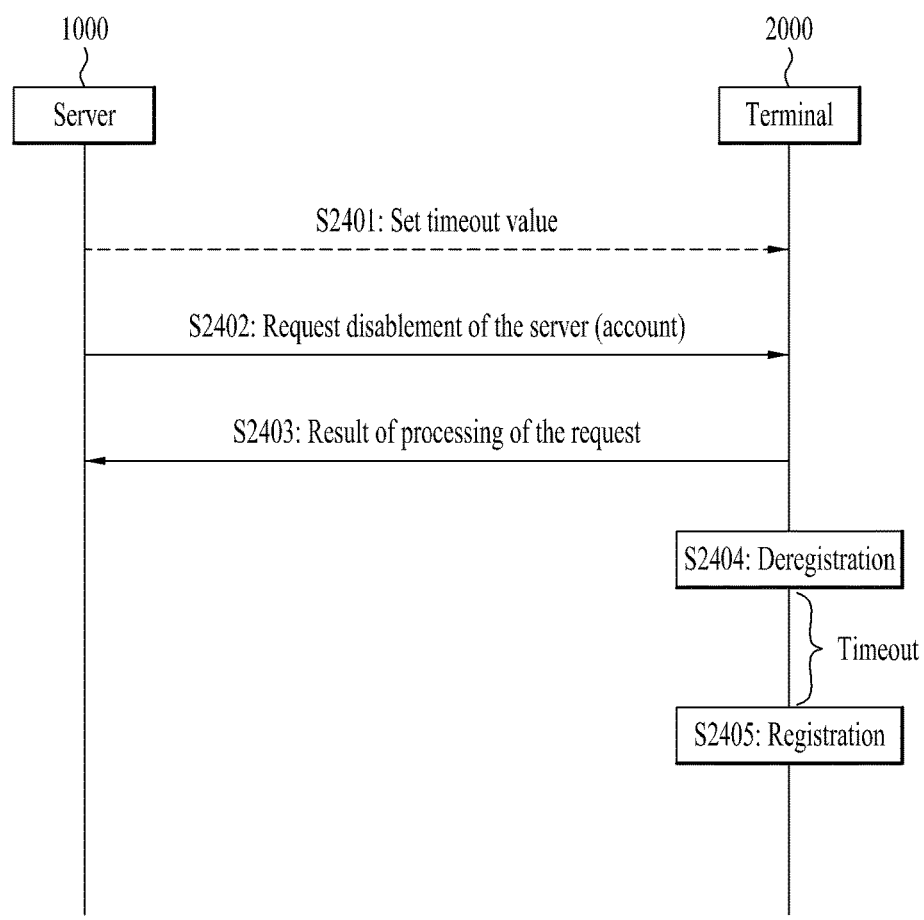
FIG. 24 is a diagram illustrating a disablement process for a server according to one embodiment of the present invention.

The timeout-based server account disablement/enablement will be described in more detail below. FIG. 24 is a diagram illustrating a disablement process for a server according to one embodiment of the present invention.

A server 1000 may transmit, to a terminal 2000, a request for setting the timeout value among objects or resources stored in the terminal (S2401). The request for setting the timeout value may include the identifier of a resource related to the timeout and a new value to be set as the timeout value.

Setting the timeout value is optional. If a default value for the timeout value is given and the timeout value is not set by the server, the timeout value is set to the default value. The timeout value may be set not only by the server 1000 but also by a third server. That is, a server to request disablement of a particular server or the particular server may set the timeout value.

The server 1000 may make a request for disablement of the particular server or particular server account to the terminal 2000 (S2402). Herein, the particular server may be the server 1000 itself, or another server. That is, the server to request the disablement may be identical to the server to be disabled.

Such request may cause the terminal to execute a disablement resource in information which is related to the particular server and configured with a plurality of resources stored in the terminal. Alternatively, the request may cause the terminal to write a new value of the disablement resource. In this case, the request needs to contain the new value.

Herein, the execution and the writing correspond to commands from the server to the terminal. Regarding the writing, a writing command (or operation) is used to simultaneously change resources, resource instances or the values of a plurality of resources in an object instance. The writing command may include the following parameters.

TABLE 11

| Parameter | Required | Default Value | Notes |
|---|---|---|---|
| Object ID | Yes | — | Indicates the Object. |
| Object Instance ID | Yes | — | Indicates the Object Instance to write. |
| Resource ID | No | — | Indicates the Resource to write. The payload is the new value for the Resource. If no Resource ID is indicated, then the included payload is an Object Instance containing the Resource values. |
| New Value | Yes | — | The new value included in the payload to update the Object Instance or Resource. |
| Minimum Period | No | 1 | When present, the minimum period indicates the minimum time in seconds the Client SHOULD wait from the time when sending the last notification to the time when sending a new notification. In the absence of this parameter, the Minimum Period is defined by the Default Minimum Period set in the LWM2M Server Object Instance related to that Server. |
| Maximum Period | No | — | When present, the maximum period indicated the maximum time in seconds the Client SHOULD wait from the time when sending the last notification to the time sending the next notification (regardless if the value has changed). In the absence of this parameter, the maximum period is up to the server. The maximum period MUST be greater than the minimum period parameter. In the absence of this parameter, the Maximum Period is defined by the Default Maximum Period set in the LWM2M Server Object Instance related to that Server. |
| Greater Than | No | — | When present, the Client SHOULD notify its value when the value is above the number specified in parameter |
| Less Than | No | — | When present, the Client SHOULDnotify its value when the value is below the number specified in the parameter |
| Step | No | — | When present, the Client SHOULD notify its value when the value is changed more than the number specified in the parameter from the Resource value when the client receives the Observe operation. |

The execution command (or operation) is used to initiate some operations, and may be executed only for individual resources. The execution command may include the following parameters.

TABLE 12

| Parameter | Required | Default Value | Notes |
|---|---|---|---|
| Object ID | Yes | — | Indicates the Object. |
| Object Instance ID | Yes | — | Indicates the Object Instance. |
| Resource ID | Yes | — | Indicates the Resource to execute. |

Figure 25:
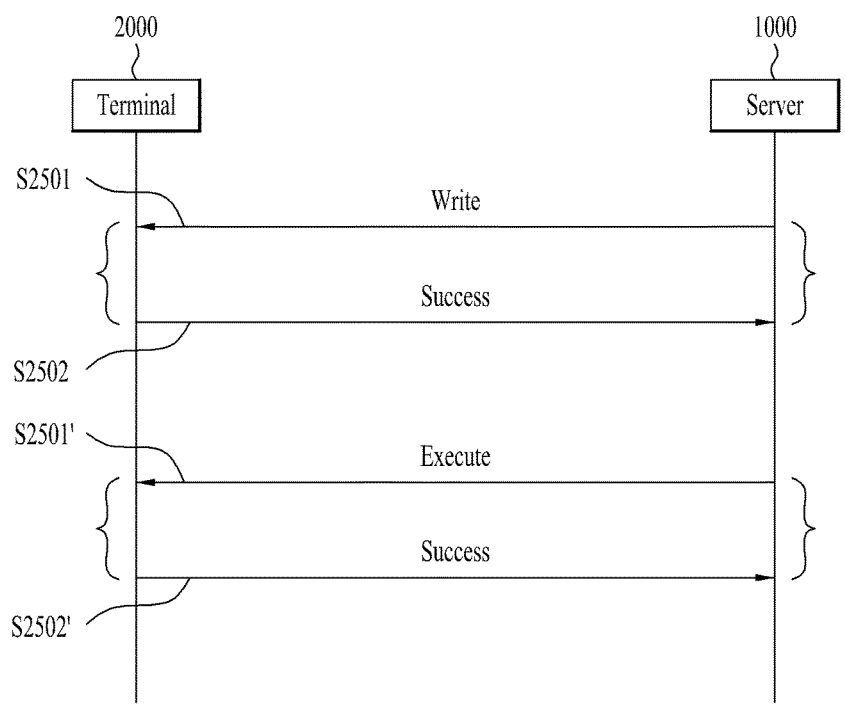

Additionally, the writing or execution command (or operation) may be executed as shown in FIG. 25. Once the server 1000 transmits a writing command to a terminal or device 2000 (S2501), the terminal or device having received the command may transmit a response to the writing command to the server (S2502). In addition, once the server 1000 transmits an execution command to the terminal or device 2000 (S2501), the terminal or device having received the command may transmit a response to the execution command to the server (S2502).

The response is a result of or a response to processing of the writing command or the execution command. More specifically, the response may correspond to one of: 1) the command (or operation) has been successfully executed; 2) the target (e.g., an object, etc.) does not allow the writing or execution command, and in the case of the writing command, the written data format is different; 3) URI for the command cannot be found; 4) the access right through the command is rejected, (namely, the server has no access right to a resource or object); and 5) the command is not supported (namely, the resource or object does not allow the writing or execution command).

Referring back to FIG. 24, the terminal may transmit a result of processing the request to the server (S2403). That is, the result of processing the request corresponds to a response to each command (or operation) described above with reference to FIG. 25.

The terminal may perform a deregistration process in relation to the particular server (S2404). The terminal may transmit a deregistration request to the particular server (S2404-1). Upon receiving the deregistration request, the particular server may delete the registration information stored therein. Then, the particular server may transmit a response to the deregistration request to the terminal. The response is a result of or response to processing of the deregistration request. More specifically, the response may correspond to 1) deregistration has been successfully completed, 2) URI of the particular server has not been found, and the like.

After the deregistration, the particular server or the particular server account is disabled during the timeout period. Accordingly, the network connection between the terminal and the particular server is lost during the timeout period.

When the timeout period passes, the particular server or the account of the particular server is re-enabled. To inform the particular server of the re-enablement and re-establish the network connection, the terminal may perform the registration process (S2405). The terminal may transmit a registration request to the particular server (S2405-1). Upon receiving the registration request, the particular server may store parameter(s) contained in the registration request. Then, the particular server may transmit a response to the registration request to the terminal. The response is a result of or a response to processing of the registration request. More specifically, the response may correspond to 1) the registration has been successfully completed; 2) essential parameters that should be contained in the registration request are not specified, or an unknown parameter is specified; and 3) the client name is not clear.

Additionally, during the timeout period, some functions of the terminal may be maintained regardless of connection to the particular server. Accordingly, the terminal may collect and store information about the particular server during the timeout period. Then, when the particular server is enabled after the timeout period, the terminal may transmit the collected or stored information to the particular server.

Figure 26:
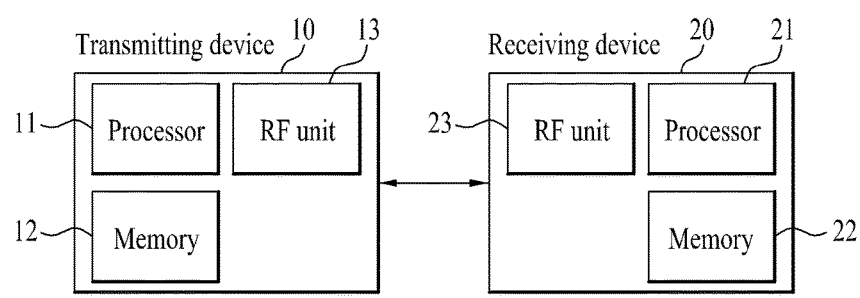
FIG. 26 is a block diagram illustrating an apparatus configured to implement embodiment(s) of the present invention.

FIG. 26 is a block diagram illustrating an apparatus configured to implement embodiment(s) of the present invention. Each of a transmitter 10 and a receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 and configured to control the memory 12, 22 and/or the RF unit 13, 23 to allow the device to implement at least one f the embodiments of the present invention described above.

The memory 12, 22 may store a program for processing and controlling the processor 11, 21, and temporarily store input/output information. The memory 12, 22 may also be utilized as a buffer.

The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

According to the embodiments of the present invention, a terminal or device and a server, or a DMC and a DMS, or an M2M client and an M2M server may respectively operate as the transmitter 10 or the receiver 20.

Specific elements of the terminal or device and the server, or the DMC and the DMS, or the M2M client and the M2M server operating as a receiver or a transmitter may be implemented such that the details of the embodiments of the present invention described above are independently applied or such that two or more embodiments are simultaneously applied.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

The present invention is applicable to a terminal, a base station, a server, or other equipment of a wireless mobile communication system.

The invention claimed is:

1. A method for disabling a particular server in a wireless communication system, the method being performed by a terminal and comprising:
   receiving, from a first server, a message for requesting disablement of an account of the particular server;
   processing the received message;
   transmitting, to the first server, a message about a result of the processing of the received message,
   wherein the account of the particular server is enabled or disabled by a particular resource, and
   wherein the particular server is disabled during a period of time indicated by a value of the particular resource, and enabled after the period if the message for requesting is successfully processed;
   collecting and storing information about the particular server during the period; and
   transmitting, to the particular server, the collected and stored information if the particular server is enabled after the period,
   wherein the processing the received message includes executing a disablement resource among a plurality of resources stored in the terminal, related to the particular server, or writing a new value as a value of the disablement resource.

2. The method according to claim 1, further comprising:
   transmitting, to the particular server, a message for requesting a deregistration for the particular server; and
   receiving, from the particular server, a message in response to the message for requesting the deregistration,
   wherein the transmitting of the message for requesting the deregistration and the receiving of the message in response to the message for requesting the deregistration are performed before the particular server is disabled after the transmitting of the message about the result of the processing of the received message.

3. The method according to claim 1, wherein a network connection between the terminal and the particular server is cut off before the particular server is disabled after the transmitting of the message about the result of the processing of the received message.

4. The method according to claim 1, further comprising:
transmitting, to the particular server, a message for requesting a registration for the particular server; and
receiving, from the particular server, a message in response to the message for requesting the registration,
wherein the transmitting of the message for requesting the registration and the receiving of the message in response to the message for requesting the registration are performed when the particular server is enabled after the period.

5. The method according to claim 1, further comprising:
receiving, from the particular server, a message for setting the period indicated by the value of the particular resource,
wherein the message for setting the period indicated by the value of the particular resource includes an identifier of the particular resource and a value to be set as the period.

6. A method for disabling a first server in a wireless communication system, the method being performed by a first server and comprising:
transmitting, to a terminal, a message for requesting disablement of an account of the first server;
receiving, from the terminal, a message about a result of processing the message for requesting the disablement,
wherein the account of the first server is enabled or disabled by a particular resource, and
wherein the first server is disabled during a period of time indicated by a value of the particular resource, and enabled after the period if the message for requesting the disablement is successfully processed; and
receiving, from the terminal, information about the first server collected and stored by the terminal during the period if the first server is enabled after the period,
wherein the terminal executes a disablement resource among a plurality of resources stored in the terminal, related to the first server, or writes a new value as a value of the disablement resource when the terminal receives the message for requesting disablement of the account of the first server.

7. The method according to claim 6, further comprising:
receiving, from the terminal, a message for requesting a deregistration for the first server; and
transmitting, to the terminal, a message in response to the message for requesting the deregistration,
wherein the receiving of the message for requesting the deregistration and the transmitting of the message in response to the message for requesting the deregistration are performed before the first server is disabled after the receiving of the message about the result of the processing.

8. The method according to claim 6, wherein a network connection between the terminal and the first server is cut off before the first server is disabled after the receiving of the message about the result of the processing.

9. The method according to claim 6, further comprising:
receiving, from the terminal, a message for requesting a registration for the first server when the first server is enabled after the period; and
transmitting, to the terminal, a message in response to the message for requesting the registration.

10. The method according to claim 6, further comprising:
transmitting, to the terminal, a message for setting the period indicated by the value of the particular resource,
wherein the message for setting the period indicated by the value of the particular resource includes an identifier of the particular resource and a value to be set as the period.

11. A terminal for disabling a particular server in a wireless communication system, the terminal comprising:
a radio frequency (RF) transceiver; and
a processor that:
controls the RF transceiver to receive, from a first server, a message for requesting disablement of an account of the particular server, to process the received message,
controls the RF transceiver to transmit, to the first server, a message about a result of the processing of the received message,
wherein the account of the particular server is enabled or disabled by a particular resource, and
wherein the account of the particular server is disabled during a period indicated by a value of the particular resource, and enabled after the period if the message for requesting is successfully processed,
collects and stores information about the particular server during the period, and
controls the RF transceiver to transmit, to the particular server, the collected and stored information if the particular server is enabled after the period,
wherein the processing of the received message includes executing disablement resource among a plurality of resources stored in the terminal, related to the particular server, or writing a new value as a value of the disablement resource.

12. A server for disabling a server in a wireless communication system, the server comprising:
a radio frequency (RF) unit; and
a processor that:
controls the RF transceiver to transmit, to a terminal, a message for requesting disablement of an account of the server,
controls the RF transceiver to receive, from the terminal, a message about a result of processing the received message,
wherein the account of the server is enabled or disabled by a particular resource, and
wherein the account of the server is disabled during a period of time indicated by a value of the particular resource, and enabled after the period if the message for requesting is successfully processed, and
controls the RF transceiver to receive, from the terminal, information about the server collected by the terminal during the period if the server is enabled after the period,
wherein the terminal executes a disablement resource among a plurality of resources stored in the terminal, related to the server, or writes a new value as a value of the disablement resource when the terminal receives the message for requesting disablement of the account of the server.

* * * * *